(12) United States Patent
Werk et al.

(10) Patent No.: US 12,203,954 B2
(45) Date of Patent: Jan. 21, 2025

(54) SINGLE-USE, DISPOSABLE CONTAINER

(71) Applicant: Bionter AG, Riehen (CH)

(72) Inventors: Tobias Werk, Riehen (CH); Matthias Eppler, Zurich (CH); Gerhard Klokow, Pratteln (CH); Simon Duerr, Pratteln (CH)

(73) Assignee: BIONTER AG, Basel (CH)

( * ) Notice: Subject to any disclaimer, the term of this patent is extended or adjusted under 35 U.S.C. 154(b) by 0 days.

(21) Appl. No.: 18/175,562

(22) Filed: Feb. 28, 2023

(65) Prior Publication Data

US 2023/0341434 A1 Oct. 26, 2023

(30) Foreign Application Priority Data

Apr. 26, 2022 (EP) .................................. 22169943

(51) Int. Cl.
| | |
|---|---|
| *G01N 35/10* | (2006.01) |
| *B01L 3/02* | (2006.01) |
| *B65D 1/00* | (2006.01) |
| *B01L 9/00* | (2006.01) |
| *G01N 15/075* | (2024.01) |
| *G01N 35/00* | (2006.01) |

(52) U.S. Cl.
CPC ........ *G01N 35/1095* (2013.01); *B01L 3/0275* (2013.01); *B65D 1/00* (2013.01); *G01N 35/1004* (2013.01); *B01L 9/543* (2013.01); *G01N 15/075* (2024.01); *G01N 2035/00277* (2013.01)

(58) Field of Classification Search
None
See application file for complete search history.

(56) References Cited

U.S. PATENT DOCUMENTS

| | | | | |
|---|---|---|---|---|
| 2003/0070498 A1* | 4/2003 | Ohyama | ............ | G01N 35/1083 73/864.02 |
| 2007/0231215 A1* | 10/2007 | Mototsu | ................ | B01L 3/0275 422/400 |
| 2011/0051134 A1 | 3/2011 | Solazzi | | |
| 2017/0210552 A1* | 7/2017 | O'Brien | ............ | B65D 85/8061 |
| 2019/0344258 A1 | 11/2019 | Motadel et al. | | |
| 2020/0001287 A1* | 1/2020 | Motadel | ................ | B01L 3/0275 |

(Continued)

FOREIGN PATENT DOCUMENTS

| | | | | |
|---|---|---|---|---|
| EP | 1795264 A1 * | 6/2007 | ............ | B01L 3/0275 |
| EP | 1839752 A2 | 10/2007 | | |

(Continued)

OTHER PUBLICATIONS

International Search Report and Written Opinion of International Application PCT/EP2023/054946, May 12, 2023, 21 pages.

*Primary Examiner* — P. Kathryn Wright
(74) *Attorney, Agent, or Firm* — Synergy IP Group AG; Lily Ackerman

(57) ABSTRACT

The present invention provides for a single-use, disposable container and methods and apparatuses for testing liquid samples in a non-destructive fashion using the single-use, disposable container within a liquid sample analyzer. The single-use, disposable container reduces the overall sample volume contact within a flow path of the liquid sample analyzer, decreases the cleaning solution and drying time needed between sample analyses, and minimizes formation of particles during use of the container.

15 Claims, 7 Drawing Sheets

(56) References Cited

U.S. PATENT DOCUMENTS

| | | | |
|---|---|---|---|
| 2020/0198813 A1* | 6/2020 | Huth | B01L 9/06 |
| 2020/0231375 A1* | 7/2020 | Held | B65D 85/8046 |
| 2022/0001376 A1 | 1/2022 | Kinney et al. | |
| 2022/0196535 A1* | 6/2022 | Werk | G01N 15/0205 |

FOREIGN PATENT DOCUMENTS

| | | | |
|---|---|---|---|
| EP | 3683157 A1 | 7/2020 |
| WO | 2008128213 A1 | 10/2008 |
| WO | 2022128179 A1 | 6/2022 |

* cited by examiner

|  | CLEAN | DRY | Aspirate | Dispense |
|---|---|---|---|---|
| 16b | close close close | open close close | close close close | close open |
| 16c | open open close | close close close | close close close | close close |
| 16d | close close close | close open open | close open close | close close |
| 16e | open open open | open close close | close close close | close close |

SINGLE-USE, DISPOSABLE CONTAINER

CROSS REFERENCE TO RELATED APPLICATIONS

This application is a United States Utility Application claiming priority to and the benefit of European Application No. 22169943.2, filed on Apr. 26, 2022, which is hereby incorporated herein by reference in its entirety.

BACKGROUND OF THE INVENTION

Liquid samples, including parenterally administered drugs such as therapeutic proteins and antibodies in the liquid state or dissolved dried matter such as lyophilisates, must be analyzed using appropriate quality control methods to meet quality standards and strict regulatory requirements. Detecting particulate contaminants is of particular importance as a quality control measure in the production of such pharmaceutical products because particulates in pharmaceutical products that are parenterally administered, for example, by injection or infusion, may lead to significant adverse events in patients. Such particulate contaminants may be detected by an optical particle counter. Optical particle counters may be used to measure the amount of subvisible particles if present in a liquid sample using light obscuration and scattering techniques. Typical optical particle counters have a light source, a measuring cell, and a detection unit, where the measuring cell has a flow path where the liquid sample is passed between the light source and detection unit. The particles interrupt the light emitted by the light source, which may be quantified and calibrated against known standardized particles to calculate a particle size distribution.

Known optical particle counters typically destroy the analyzed liquid sample because the sample may become contaminated with any cleaning solution residues that may remain in the flow path or microorganisms that may have contaminated the sample during sample preparation. Additionally, known optical particle counters may require relatively large amounts of liquid sample for the analysis. Parenterally administered drugs are generally more costly to manufacture than other pharmaceutical dosage forms because of the manufacturing technology involved and the high-quality assurance required. The costs are especially significant for therapeutic proteins, for example, those proteins manufactured biotechnologically, therapeutic peptides, oligonucleotides such as RNA or DNA, viral vector or cell therapy or other advanced medicinal therapeutic medicines (ATMPs). Therefore, it is desirable to develop methods of analyzing liquid samples in a non-destructive fashion. These methods would produce a liquid sample that is substantially the same after performance of the method steps as the liquid sample to be analyzed such that the sample may be used or tested again after the analysis. It is also desirable to develop methods of analyzing liquid samples that utilize as small amount of sample as possible.

WO2008/128213A1 discloses cytometry methods, where cells are analyzed in a flow stream as a streamline of particulates (a "plug") substantially retaining the same linear order as the cells pass through a measuring area. The ordering of the cells is maintained by oscillating the carrier fluid back and forth in a capillary during the measurement. The plug of ordered cells may be controlled to pass through a measurement area for analysis. The methods do not analyze samples in a non-destructive fashion, where the liquid sample is substantially the same after performance of the method steps as the liquid sample to be analyzed, as fresh carrier fluid is introduced into the capillary during each oscillation cycle to maintain the order or the cells and/or confine the cells inside the capillary, characteristics of the cells (e.g., size, number) are changing over time due to cell growth and cell division, other agents (e.g., therapeutic compounds) are introduced into the flow stream to monitor real time effects on the cells, and/or specific cells are sorted out of the bulk sample during the analysis.

US2019/0344258A1, EP1839752A2, and US2022/0001376A1 disclose pipette tips. The references do not disclose that the flat top surface, the flat bottom surface, and the inner surface of the frustoconical shape of the pipette tips are polished with a surface average roughness (Ra) of not more than about 0.15 µm. Such a surface average roughness is necessary for sealing the flat top surface and flat bottom surface within a liquid sample analyzer under pressure. Furthermore, a surface average roughness (Ra) of not more than about 0.15 µm of the inner surface of the frustoconical shape is necessary to reduce the amount of testing sample that may adhere to the surface, thereby allowing for the recovery of the maximum amount of testing sample during the sample analysis and to prevent the formation of additional particles or aggregates in the sample.

Methods of performing an optical measurement in a liquid sample and apparatuses adapted to carry out these methods, in particular where the sample is not destroyed during performance of any of the method steps and/or the liquid sample is recovered after performance of the method steps, have been disclosed in WO2022/128179A1, filed by the same applicant as the present invention. After performance of the method steps, the liquid sample would be substantially the same as the liquid sample prior to performance of any of the method steps. In certain embodiments, the methods and apparatuses make use of an intermediate container where the liquid sample is temporarily stored during the method steps. The liquid sample may be degassed, or an additional analytical measurement may be performed on the liquid sample while temporarily stored in the intermediate container.

To ensure that the liquid sample is not destroyed or contaminated with cleaning solution residues that may remain in the flow path, the flow path is cleaned and dried between each sample analysis. As the liquid sample volume increases, more liquid sample contacts the flow path requiring more cleaning solution to clean the flow path and more drying time before the next sample analysis.

It is thus an object of the present invention to provide a single-use, disposable container to reduce the overall sample volume contact with the flow path, decrease the cleaning solution and drying time needed between sample analyses, and minimize formation of particles during use of the container. Another object of the present invention provides methods and apparatuses of analyzing a liquid sample using such a single-use, disposable container. Further objects of the invention will be clear on the basis of the following description of the invention, examples and claims.

SUMMARY OF THE INVENTION

The present invention provides for a single-use, disposable container and methods and apparatuses for testing liquid samples in a non-destructive fashion using the single-use, disposable container within a liquid sample analyzer. The single-use, disposable container reduces the overall sample volume contact within a flow path of the liquid sample analyzer, decreases the cleaning solution and drying time needed between sample analyses, and minimizes formation of particles during use of the container.

In a first aspect, the invention relates to a single-use, disposable container, wherein the single-use, disposable container is stackable and fluidically sealable within a fluid path comprising a liquid sample analyzer, the single-use, disposable container comprising: (a) a material that accommodates a pressure up to about +2.5 bar or +250 Kilopascals (hereinafter "kPa"); (b) a frustoconical shape having an open top end and open bottom end to flow liquid through the container; (c) a flat top surface of the open top end comprising a top ring, wherein the flat top surface of the open top end of the container is fluidically sealable within the fluid path; (d) a flat bottom surface of the open bottom end comprising a bottom ring, wherein the flat bottom surface of the open bottom end of the container is fluidically sealable within the fluid path; (e) an outer surface of the frustoconical shape tapering from the inner edge of the top ring to the outer edge of the bottom ring; (f) a first set of spaced protrusions on the outer surface of the frustoconical shape supporting the top ring of the flat top surface, wherein the first set of spaced protrusions are adapted to facilitate stacking and de-stacking the container; and (g) a second set of spaced protrusions on the outer surface of the frustoconical shape located below the first set of spaced protrusions and above the flat bottom surface, wherein the second set of spaced protrusions minimizes surface area contact of the outer surface of the frustoconical shape with the inner surface of the frustoconical shape of an adjacent stacked container; and (h) an inner surface of the frustoconical shape; wherein the flat top surface, the flat bottom surface, and the inner surface of the frustoconical shape are polished with a surface average roughness (Ra) of not more than about 0.15 μm.

In a further aspect, the invention relates to a method of performing an optical measurement in a liquid sample, the method comprising: (a) obtaining a first container filled with the liquid sample to be analyzed; (b) flowing the liquid sample along a first flow direction through a flow path comprising an optical measuring device and optionally performing an optical measurement of the liquid sample as the liquid sample flows in the first flow direction; (c) storing the liquid sample temporarily in an intermediate container after flowing the liquid sample along the first flow direction through the flow path comprising the optical measuring device and optionally performing the optical measurement of the liquid sample as the liquid sample flows in the first flow direction; wherein the intermediate container is any embodiment of the single-use, disposable container disclosed herein; (d) flowing the liquid sample from the intermediate container along a second flow direction opposite the first flow direction through the flow path comprising the optical measuring device and performing the optical measurement of the liquid sample as the liquid sample flows in the second flow direction; and (e) flowing the liquid sample through the flow path into a second container after performing the optical measurement in the second flow direction; wherein the first container and the second container may be the same or different containers; and wherein when the liquid sample is in the second container it is substantially the same as when the liquid sample is in the first container.

In yet a further aspect, the invention provides an apparatus adapted to carry out the methods disclosed herein, the apparatus comprising the optical measuring device and any embodiment of the single-use, disposable container disclosed herein.

DETAILED DESCRIPTION OF THE INVENTION

Definitions

Figure 1:
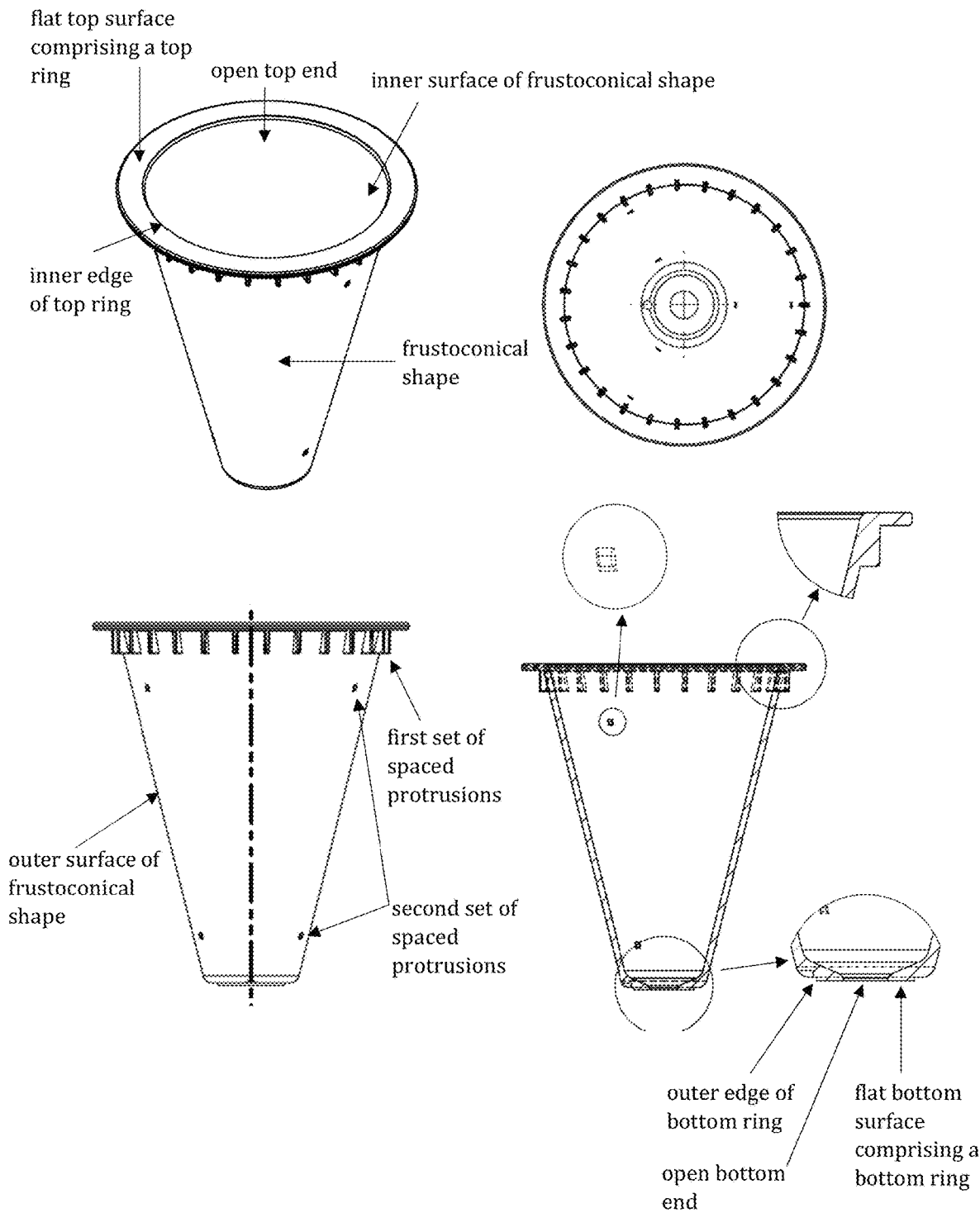
FIG. 1 depicts an embodiment of a single-use, disposable container disclosed herein.

The following terms or expressions as used herein should normally be interpreted as outlined in this section, unless defined otherwise by the description or unless the specific context indicates or requires otherwise.

Unless the context clearly indicates or requires otherwise, the words 'comprise', 'comprises' and 'comprising' and similar expressions are to be construed in an open and inclusive sense, as 'including, but not limited to' in this description and in the claims.

'A' or 'an' does not exclude a plurality, i.e., the singular forms 'a', 'an' and 'the' should be understood as to include plural referents unless the context clearly indicates or requires otherwise. In other words, all references to singular characteristics or limitations of the present disclosure shall include the corresponding plural characteristic or limitation, and vice versa, unless explicitly specified otherwise or clearly implied to the contrary by the context in which the reference is made. The terms 'a', 'an' and 'the' hence have the same meaning as 'at least one' or as 'one or more' unless defined otherwise. For example, reference to 'an ingredient' includes mixtures of ingredients, and the like.

The expressions, 'one embodiment', 'an embodiment', 'a specific embodiment' and the like mean that a particular feature, property or characteristic, or a particular group or combination of features, properties or characteristics, as referred to in combination with the respective expression, is present in at least one of the embodiments of the invention. The occurrence of these expressions in various places throughout this description do not necessarily refer to the same embodiment. Moreover, the particular features, properties or characteristics may be combined in any suitable manner in one or more embodiments.

In the context of the invention, a 'composition' refers to any type of composition in which the specified ingredients may be incorporated, optionally along with any further constituents. For example, the composition may be in liquid form, and each constituent may be independently incorporated in dissolved or dispersed (e.g., suspended or emulsified) form.

The term 'dead volume' as used herein refers to the volume of a vessel or container where no liquid or fluid is present.

'Essentially', 'about', 'approximately', 'substantially' and the like in connection with an attribute or value include the exact attribute or the precise value, as well as any attribute or value typically considered to fall within a normal range or variability accepted in the technical field concerned.

A 'formulation', with respect to a pharmaceutically active compound that is incorporated in it and administered by means of the formulation, is any product which is pharmaceutically acceptable in terms of its composition and manufacturing method which comprises at least one pharmaceutically active compound and one excipient, carrier, vehicle or other auxiliary material.

The expression 'substantially the same' as used herein means that the liquid sample retains largely the same characteristics before the liquid sample is introduced into the optical measuring apparatus and after the sample is flowed into the second container after performance of the method steps, except that less than a functional amount of contaminants may be introduced into the sample while flowing in the flow path, typically less than about 10 vol. %, about 5 vol. %, or about 1 vol. % residual fluid or cleaning solution and less than about 0.01 wt. % other trace impurities, such that the liquid sample may be used for further optical or analytical measurements or for administration to a patient. A variety of analytical techniques known in the art may be used to determine if the liquid sample is substantially the same before and after performance of the method steps disclosed herein.

The expression 'surface average roughness (Ra)' as used herein means the average roughness value that specifies the average distance of actual surface height deviations from the mean contour line. In other words, Ra is the average of a set of individual measurements of the peaks and valleys of a surface. Suitable measuring methods include white light interferometry or confocal microscopy. Ra is calculated by the following equation:

$$Ra = \left(\frac{1}{L}\right)\int_0^L |Z(x)|dx$$

where L is the evaluation length and Z(x) is the profile height function.

Description

The single-use, disposable container and methods and apparatuses using the container disclosed herein relate generally to the testing of liquid samples. These liquid samples can themselves be a formulation or dissolved liquid from a pharmaceutical product that is a solid, using an appropriate diluent to reconstitute the solid. Such a solid can be a lyophilizate, or spray-dried or dried by any other means. In particular, the liquid samples are tested for the presence of subvisible particles using an optical measuring device. These subvisible particles can be of different shape and size and composition, including extrinsic (foreign) contaminants such as fibres or glass sheds, and intrinsic and inherent particles such protein particles, particles from fatty acids stemming from polysorbate degradation, suspended particles such as cells and other particles, and any combination thereof. Preferably, the liquid samples are not destroyed (e.g., non-diluted, non-compromised, non-contaminated) during performance of any of the method steps and may be recovered after the testing to be used in other analytical testing methods or for other purposes. The single-use, disposable container and the methods and apparatuses using the container have been designed to minimize the quantity of contaminants that are introduced into the liquid sample, such as residual cleaning fluid residues and/or other contaminates (e.g., salts, solids) that may be present in the flow path after cleaning between samples.

In a first aspect, the invention relates to a single-use, disposable container, wherein the single-use, disposable container is stackable and fluidically sealable within a fluid path comprising a liquid sample analyzer, the single-use, disposable container comprising: (a) a material that accommodates a pressure up to about +2.5 bar or +250 kPa; (b) a frustoconical shape having an open top end and open bottom end to flow liquid through the container; (c) a flat top surface of the open top end comprising a top ring, wherein the flat top surface of the open top end of the container is fluidically sealable within the fluid path; (d) a flat bottom surface of the open bottom end comprising a bottom ring, wherein the flat bottom surface is fluidically sealable within the fluid path; (e) an outer surface of the frustoconical shape tapering from the inner edge of the top ring to the outer edge of the bottom ring; (f) a first set of spaced protrusions on the outer surface of the frustoconical shape supporting the top ring of the flat top surface, wherein the first set of spaced protrusions are adapted to facilitate stacking and de-stacking the container; and (g) a second set of spaced protrusions on the outer surface of the frustoconical shape located below the first set of spaced protrusions and above the flat bottom surface, wherein the second set of spaced protrusions minimizes surface area contact of the outer surface of the frustoconical shape with the inner surface of the frustoconical shape of an adjacent stacked container; and (h) an inner surface of the frustoconical shape; wherein the flat top surface, the flat bottom surface, and the inner surface of the frustoconical shape are polished with a surface average roughness (Ra) of not more than about 0.15 µm. In some embodiments, when the single-use, disposable container is fluidically sealed within the fluid path comprising a liquid sample analyzer, the pressure of the system may be measured using a standard pressure sensor. In some embodiments, the operating pressure of the system is up to about +2.5 bar or about +250 kPa. Therefore, in certain embodiments, the single-use, disposable container is manufactured with a material that accommodates a pressure of up to about +2.5 bar or about +250 kPa.

In some embodiments of the first aspect described above, the surface average roughness (Ra) of not more than about 0.15 µm of the flat top surface, the flat bottom surface, and the inner surface of the frustoconical shape serves two purposes. First, the smoothness of the flat top surface and flat bottom surface is necessary to fluidically seal the single-use, disposable container within the fluid path of the liquid sample analyzer under the above-described pressure conditions. In some embodiments, surface average roughness (Ra) values above about 0.15 µm are insufficient to adequately seal in the fluid path of the liquid sample analyzer. Second, the smoothness of the inner surface of the frustoconical shape reduces the amount of testing sample that may adhere to the surface, thereby allowing for the recovery of the maximum amount of testing sample during the sample analysis and preventing the formation of additional particles or aggregates in the sample. In some embodiments, the flat top surface, the flat bottom surface, and the inner surface of the frustoconical shape of the single-use, disposable container has a surface average roughness (Ra) from about 0.01 µm to about 0.15 µm. In other embodiments, the flat top surface of the single-use, disposable container has a surface average roughness (Ra) from about 0.02 µm to about 0.05 µm. In yet other embodiments, the flat top surface of the single-use, disposable container has a surface average roughness (Ra) from about 0.02 µm to about 0.03 µm.

In some embodiments of the first aspect described above, the single-use, disposable container is configurable to receive a volume of liquid of at least about 20 mL. In other embodiments, the single-use, disposable container is configurable to receive a volume of liquid of at least about 20 mL when fluidically sealed in the fluid path of the liquid sample analyzer. In some embodiments, the container is configurable to receive a volume of liquid of at least about 25 mL. In other embodiments, the single-use, disposable container is configurable to receive a volume of liquid of at least about 25 mL when fluidically sealed in the fluid path of the liquid sample analyzer. In some embodiments, the single-use, disposable container has a wall thickness from about 0.3 mm to about 2.0 mm when measured at a location within the frustoconical shape of the container. In other embodiments, the single-use, disposable container has a wall thickness of about 0.7 mm when measured at a location within the frustoconical shape of the container. In some embodiments, the single-use, disposable container has a height of up to about 60 mm. In other embodiments, the single-use, disposable container has a height of about 55 mm to about 60 mm. In yet other embodiments, the single-use, disposable container has a height of about 58.5 mm.

In some embodiments of the first aspect described above, the top ring of the single-use, disposable container has an external diameter of about 45 to about 55 mm measured from the outer edge. In other embodiments, the top ring of the single-use disposable container has an external diameter of about 51 mm measured from the outer edge. In some embodiments, the top ring of the single-use, disposable container has an internal diameter of about 40 to about 50 mm measured from the inner edge.

In other embodiments, the top ring of the single-use, disposable container has an internal diameter of about 45 mm measured from the inner edge. In some embodiments, the open bottom end of the single-use, disposable container has a diameter of about 3.8 mm to about 12 mm. In other embodiments, the open bottom end of the single-use disposable container has a diameter of about 3.8 to about 7 mm.

In yet other embodiments, the open bottom end of the single-use disposable container has a diameter of about 5 mm. In some embodiments, the single-use, disposable container has a stacking height of about 1.5 mm to about 10 mm, wherein the stacking height is defined as the distance between the flat top surface and a distal end of the first set of spaced protrusions. In other embodiments, the single-use, disposable container has a stacking height of about 3 mm to about 7 mm. In yet other embodiments, the single-use, disposable container has a stacking height of about 5 mm.

In some embodiments of the first aspect described above, the top ring and the bottom ring of the single-use, disposable container must be of sufficient width (e.g., distance between the outer diameter and inner diameter of the top or bottom ring) to engage and fluidically seal with sealing surfaces of the fluid path comprising the liquid sample analyzer. In some embodiments, the top ring of the single-use, disposable container has a width of at least about 3 mm. In other embodiments, the top ring of the single-use, disposable container has a width of at least about 4 mm. In yet other embodiments, the top ring of the single-use, disposable container has a width of at least about 5 mm. In yet other embodiments, the top ring of the single-use, disposable container has a width of at least 6 mm. In some embodiments, the bottom ring of the single-use, disposable container has a width of at least about 1 mm. In other embodiments, the bottom ring of the single-use, disposable container has a width of at least about 2 mm. In yet other embodiments, the bottom ring of the single-use, disposable container has a width of at least about 2.5 mm. In yet other embodiments, the top ring of the single-use, disposable container has a width of at least 2.9 mm.

In some particular embodiments of the first aspect described above, the top ring of the single-use, disposable container has a width (e.g., distance between the outer diameter and inner diameter of the top or bottom ring) of at least about 3 mm and the bottom ring of the single-use-disposable container has a width of at least 1 mm. In other particular embodiments, the top ring of the single-use, disposable container has a width of at least about 4 mm and the bottom ring of the single-use-disposable container has a width of at least 2 mm. In yet other particular embodiments, the top ring of the single-use, disposable container has a width of at least about 5 mm and the bottom ring of the single-use-disposable container has a width of at least 2.5 mm. In yet other particular embodiments, the top ring of the single-use, disposable container has a width of at least about 6 mm and the bottom ring of the single-use-disposable container has a width of at least 2.9 mm.

In some particular embodiments of the first aspect described above, the single-use, disposable container is configurable to receive a volume of liquid of at least about 25 ml when fluidically sealed in the fluid path of the liquid sample analyzer; the container has a wall thickness of about 0.7 mm when measured at a location within the frustoconical shape of the container; the container height is about 58.5 mm; the top ring has an external diameter of about 51 mm; the top ring has an internal diameter of about 45 mm; the open bottom end of the container has a diameter of about 5 mm; and the container has a stacking height of about 5 mm; wherein the stacking height is defined as the distance between the flat top surface and a distal end of the first set of spaced protrusions.

In some embodiments of the first aspect described above, the single-use, disposable container comprises any material that accommodates a pressure up to about +2.5 bar or +250 kPa. In some embodiments, the single-use, disposable container comprises a material that is a hydrocarbon polymer. In other embodiments, the single-use, disposable container comprises a material that is polypropylene. In other embodiments, the single-use, disposable container comprises a material that consists essentially of a hydrocarbon polymer or, more specifically polypropylene. In yet other embodiments, the single-use, disposable container comprises a material that is resistant to sterilization using γ radiation.

The single-use, disposable container disclosed herein may be distinguished from other objects, such as pipette tips or other containers. In some cases, such objects do not comprise a flat top surface and/or a flat bottom surface that are sealable under pressure within a liquid sample analyzer. In other cases, the objects do not comprise a flat top surface, a flat bottom surface, and an inner surface of the frustoconical shape polished with a surface average roughness (Ra) of not more than about 0.15 µm. Such a surface average roughness is necessary for sealing the flat top surface and flat bottom surface within a liquid sample analyzer under pressure. Furthermore, a surface average roughness (Ra) of not more than about 0.15 µm of the inner surface of the frustoconical shape is necessary to reduce the amount of testing sample that may adhere to the surface, thereby allowing for the recovery of the maximum amount of testing sample during the sample analysis and to prevent the formation of additional particles or aggregates in the sample. Moreover, pipette tips do not have the requisite structure or smoothness to seal both the flat top surface and flat bottom surface within a liquid sample analyzer because the tips are used for a different purpose. The structure of a pipette tip is designed to aspirate and dispense liquid from the bottom end of the tip without sealing the bottom end of the tip within an apparatus.

In a second aspect, the invention relates to a method of performing an optical measurement in a liquid sample, the method comprising: (a) obtaining a first container filled with the liquid sample to be analyzed; (b) flowing the liquid sample along a first flow direction through a flow path comprising an optical measuring device and optionally performing an optical measurement of the liquid sample as the liquid sample flows in the first flow direction; (c) storing the liquid sample temporarily in an intermediate container after flowing the liquid sample along the first flow direction through the flow path comprising the optical measuring device and optionally performing the optical measurement of the liquid sample as the liquid sample flows in the first flow direction, wherein the intermediate container is any embodiment of the single-use, disposable container disclosed herein; (d) flowing the liquid sample from the intermediate container along a second flow direction opposite the first flow direction through the flow path comprising the optical measuring device and performing the optical measurement of the liquid sample as the liquid sample flows in the second flow direction; and (e) flowing the liquid sample through the flow path into a second container after performing the optical measurement in the second flow direction; wherein the first container and the second container may be the same or different containers; and wherein when the liquid sample is in the second container it is substantially the same as when the liquid sample in the first container. In some embodiments, the liquid sample in the second container is diluted with less than about 10 volume %, less than about 5 volume %, or less than about 1 volume % residual fluid in the fluid path.

In some embodiments of the second aspect described above, the optical measurement is a light obscuration measurement, a light scattering measurement, or a combination thereof. In some embodiments, the optical measuring device is an optical particle counter. The optical particle counter generally performs the optical measurement by detecting an amount of light scattered or obscured by one or more particles in the liquid sample, which may be referred to as "pulse height" analysis. Alternatively, the optical particle counter may perform the optical measurement by detecting an amount of time needed for one or more particles in the liquid sample to pass the light, which may be referred to as "pulse duration" analysis. In some embodiments, the particles are analyzed by pulse height analysis, pulse duration analysis, or both pulse height and pulse duration analysis. Typically, the light source is a laser. In some embodiments, the wavelength of light used is from about 400 nm to about 800 nm. Using data obtained from the optical measurement, the particles may be classified, for example, as silicone droplets, cells, particles such as protein aggregates, and/or foreign particulate matter. In certain liquid samples to be analyzed, the protein particles may be partially translucent and analysis of their quantity and/or size may be underestimated when analyzing pulse heights. Such liquid samples may be better analyzed using the pulse duration analysis. However, the pulse duration analysis requires an accurate flow rate. Methods that correlate the pulse height may tolerate less accurate flow rates but assume particles to be opaque.

Similarly, viscous samples analyzed by pulse height analysis may be inaccurate due to air intake into the measurement cell resulting in a reduced measurement volume. Additionally, viscous samples analyzed by pulse duration analysis may also result in inaccurate particle size classifications due to a reduced flow rate and increased time to pass the light beam as compared to less viscous control solutions. Applying a calibration curve derived from standardized particles allows for calculation of a particle size distribution.

In some embodiments of the second aspect described above, the methods and apparatuses for performing an optical measurement in a liquid sample disclosed herein may more accurately classify particles in liquid samples in comparison with the known systems, especially for viscous samples, because the flow meter may be used to compensate for the differences in sample viscosity. In some embodiments, the flow meter may be associated with a temperature sensor. In any of the embodiments disclosed herein, a flow meter may be substituted with a liquid detection sensor. Similarly, if the flow meter has an associated temperature sensor, the flow meter and its associated temperature sensor may be substituted with a liquid detection sensor. In some embodiments, the liquid sample to be measured by the methods and apparatuses disclosed herein has a viscosity in the range of about 1 to about 50 centipoise (cP). In other embodiments, the liquid sample has a viscosity in the range of about 0.7 to about 100 mPas at a temperature of about 0 to about 60° C. In yet other embodiments, the liquid sample has a viscosity in the range of about 1 to about 100 mPas at a temperature of about 2 to about 40° C. In yet other embodiments, the viscosity is measured at a temperature of about room temperature or about 25° C.

In some embodiments of the second aspect described above, the methods further comprise (f) flowing a cleaning fluid through the flow path comprising the optical measuring device before step (b) and/or after the liquid sample has flowed into the second container. In yet other embodiments, the methods further comprise (g) drying the flow path subsequent to step (f). The apparatus adapted to carry out the methods of performing an optical measurement in a liquid sample may be configured such that the cleaning fluid cleans the inside of the measuring cell and inside and outside of the probe using a washing station. The cleaning solution may be collected in a waste container. A clean gas, such as filtered air, may be sucked and/or blown though the components to be dried, such as the probe, the measuring cell, the flow path, and/or other components. Cleaning and drying the fluid path in between samples allows for smaller sample volumes to be used because the mixing phase of the cleaning fluid and liquid sample are eliminated, obviating the need for larger sample volumes to compensate for such mixing. The cleaning and drying step also minimizes or eliminates the amount of liquid cleaning residues that remain in the flow path and could potentially contaminate the liquid sample. In some embodiments, the cleaning fluid is flowed through the flow path comprising the optical measuring device until a conductivity limit is reached. A variety of techniques known in the art may be used to determine when the conductivity of the residual fluid flowing through the flow path during the cleaning process reaches a limit to ensure that the residual fluid remaining in the flow path would not contaminate the subsequent sample, for example, by measuring the conductivity of the residual fluid with a conductivity meter or conductivity sensor. In some embodiments, the conductivity limit is less than about 100 microsiemens per centimeter (μS/cm) at about 2 to about 40° C. In other embodiments, the conductivity limit is less than about 10 microsiemens per centimeter (μS/cm) at about 2 to about 40° C. In yet other embodiments, the conductivity limit is less than about 5 microsiemens per centimeter (μS/cm) at about 2 to about 40° C. In some embodiments, the conductivity limit is measured at a temperature of about room temperature or about 25° C. In general, the cleaning fluid itself has a low conductivity. In some embodiments, the cleaning fluid is water.

In some embodiments of the second aspect described above, the flow path is dried until a volume limit of residual fluid is reached. A variety of techniques known in the art may be used to determine the time required for drying to ensure that residual fluid remaining in the flow path would not contaminate the subsequent sample, for example, by using standard analytical techniques and measuring the water content in the original sample and recovered sample and comparing the two values. In some embodiments, the volume limit is less than about 100 μL. In other embodiments, the volume limit is less than about 50 μL. In yet other embodiments, the volume limit is less than about 10 μL. In some embodiments, an optional drying system with a heat source may be used to dry the fluid path more quickly. In other embodiments, the fluid path may be dried by applying an over pressure of gas in the flow path for a first period of time, followed by an under pressure in the flow path for a second period of time. In some embodiments, the over pressure is about 0.05 or about 5 kPa to about 2.5 bar or about 250 kPa for and the first period of time is about 1 to about 10 seconds. In other embodiments, the overpressure is about 1 bar or about 100 kPa, and the first period of time is about 5 seconds. In some embodiments, the under pressure is about −0.99 bar or about −99 kPa to about −0.05 bar or about −5 kPa and the second period of time is about 15 seconds to about 180 seconds. In other embodiments, the under pressure is about −0.9 bar or about −90 kPa and the second period of time is about 30 seconds.

In other embodiments of the second aspect described above, the methods further comprise performing an analytical measurement in addition to the optical measurement. In some embodiments, the analytical measurement of the liquid sample is carried out while the fluid is flowing in the flow path. In some embodiments, the analytical measurement of the liquid sample is carried out while the fluid is flowing in the flow path in the first direction, the second direction, in both the first and the second directions, or while the fluid is temporarily stored in the intermediate container, wherein the intermediate container is any embodiment of the single-use, disposable container disclosed herein. In some embodiments, the analytical measurement of the liquid sample is carried out while the fluid is temporarily stored in the intermediate container, wherein the intermediate container is any embodiment of the single-use, disposable container disclosed herein. Although the optical measurement may also be considered an analytical measurement, as disclosed herein, at least one additional analytical measurement is performed in addition to the one or more optical measurements. For example, the optical measurement may be made in both the first flow direction and the second flow direction, and then an additional analytical measurement, e.g., such as viscosity, may also be made in the first flow direction, the second flow direction, and/or when the sample is stored in the intermediate container, wherein the intermediate container is any embodiment of the single-use, disposable container disclosed herein.

In some embodiments of the second aspect described above, the analytical measurement is a flow microscopy measurement, a digital imaging measurement, a UV/VIS spectrometry measurement, a coloration measurement, a turbidity measurement, a viscosity measurement, a pH measurement, a density measurement or any combination of said measurements. In some embodiments, the analytical measurement is carried out while the fluid is flowing in the flow path. In other embodiments, the analytical measurement is carried out while the fluid is temporarily stored in the intermediate container, wherein the intermediate container is any embodiment of the single-use, disposable container disclosed herein.

In some embodiments of the second aspect described above, the liquid sample may be, for example, a small molecule formulation, a peptide formulation, a protein formulation, an oligonucleotide formulation (e.g., DNA, RNA, or combinations thereof), a cell suspension, a viral or viral vector formulation or a formulation comprising any combination of the preceding molecules. Typically, the liquid samples are pharmaceutical formulations or dissolved dried pharmaceutical formulations requiring quality control testing to meet quality and regulatory requirements. In some embodiments, the liquid samples may be a solution, suspension, or an emulsion.

In other embodiments, the liquid sample comprises a therapeutic composition. Non-limiting examples of therapeutic compositions include compositions formulated for injection, infusion, implant or ophthalmic administration.

In other embodiments of the second aspect described above, the sample is not destroyed during performance of any of the method steps. For example, in some embodiments, the sample is not diluted with more than 10 vol. % residual fluid or cleaning fluid in the flow path, and wherein the sample is contaminated with less than about 0.01 wt. % other trace impurities. In other embodiments, the sample is not diluted with more than 5 vol. % residual fluid or cleaning fluid in the flow path, and wherein the sample is contaminated with less than about 0.01 wt. % other trace impurities. In yet other embodiments, the sample is not diluted with more than 1 vol. % residual fluid or cleaning fluid in the flow path, and wherein the sample is contaminated with less than about 0.01 wt. % other trace impurities. In yet other embodiments, the sample is not diluted with more than about 10 vol. %, about 5 vol. %, or about 1 vol. % residual fluid or cleaning fluid in the flow path, and wherein the sample is contaminated with less than about 0.01 wt. % other trace impurities.

In some embodiments of the second aspect described above, the liquid sample is recovered after performance of the method steps. Typically, the liquid sample is recovered in the second container to be used for other purposes such as further analytical tests and/or to be administered to a patient. In some embodiments, the second container where the sample is recovered may be the first container where the sample was stored before performance of the method steps. In other embodiments, the second container where the sample is recovered may be a different container than the first container where the sample was stored before performance of the method steps. In some embodiments, 90% by volume of the liquid sample is recovered in the second container after performance of the method steps. In other embodiments, 95% by volume of the liquid sample is recovered in the second container after performance of the method steps. It yet other embodiments at least 90% or at least 95% of the liquid sample is recovered in the second container after performance of the method steps.

The methods of performing an optical measurement in a liquid sample disclosed herein may be distinguished from cytometry methods, where cells are analyzed in a flow stream. In general, cytometry methods track the properties of individual cells in real time by oscillating the fluid back and forth in "strokes" during the measurement ("Segre Silberberg" effect). The "strokes" cause the cells to substantially retain the same linear order as they pass through the measuring area. The methods disclosed herein include no "strokes" or "oscillations", and the particulates to be analyzed do not substantially retain the same linear order as they pass through the measuring area. Furthermore, the cytometry methods do not analyze samples in a non-destructive fashion, where the liquid sample is substantially the same after performance of the method steps as the liquid sample to be analyzed. For example, the cytometry methods introduce a constant supply of fresh fluid to the measuring area while particulates are retained in the measuring area. In contrast, the methods disclosed herein do not introduce any new fluids or components except for small amounts of residual liquid or other contaminants remaining in the flow path during the analysis. The flow path of the methods disclosed herein is essentially empty and dried before the sample to be analyzed is introduced. Furthermore, in cytometry methods, the properties of the liquid sample are further dynamically changing during the analysis such that the liquid sample is not substantially the same after performance of the method steps. The cells are growing and dividing, and those properties are observed and monitored; other agents (e.g., therapeutic compounds) are introduced into the flow stream to monitor real time effects on the cells; and/or specific cells are sorted out of the bulk sample during the analysis.

In a third aspect, the invention relates to an apparatus adapted to carry out any of the methods of performing an optical measurement in a liquid sample disclosed herein. In some embodiments, the apparatus comprises the optical measuring device. In other embodiments, the apparatus comprises the optical measuring device and any of embodiment of the single-use, disposable container disclosed herein. In yet other embodiments, the apparatus comprises an automated system to carry out step (a), obtaining a first container filled with the liquid sample to be analyzed, of the methods disclosed herein. In some embodiments, the automated system also de-stacks the single-use, disposable container from a stack of a plurality of single-use, disposable containers and places and seals the container in the flow path to receive the liquid sample in step (c). In some embodiments, after step (e), the automated system removes the single-use, disposable container from the flow path. In other embodiments, the automated system comprises at least one robot arm. In yet other embodiments, one or more automated systems with one or more robot arms are used to move the liquid sample containers in and out of position to be analyzed and to move the single-use, disposable containers in and out of the flow path between sample analyses.

In some specific embodiments of the third aspect described above, the apparatus adapted to carry out any of the methods of performing an optical measurement in a liquid sample disclosed herein comprises the optical measuring device and any embodiment of the single-use, disposable container disclosed herein. In other specific embodiments, the apparatus further comprises (a) a probe (3) in fluid communication with the optical measuring device to draw a liquid sample from a container (4) along a flow path; (b) a vessel to store cleaning solution (7); (c) an optional temperature sensor (12); (d) an optional conductivity sensor (15); (e) a first valve (16a) located between a first pump (20) and the vessel to store the cleaning solution (7); wherein the first pump (20) and the first valve (16a) maintain a positive pressure in the apparatus; (f) a second valve (16b) located between a dead volume of the vessel to store the cleaning solution (7) and a fluid path comprising the optical measuring device (2) and the probe (3); wherein the positive pressure in the apparatus pushes a liquid sample along a flow direction (6) when the second valve (16b) is open; (g) a third valve (16c) located between a volume of cleaning solution contained in the vessel (7) and the fluid path comprising the optical measuring device (2) and the probe (3); wherein when the second valve (16b) is closed and the third valve (16c) is open, the cleaning solution is pushed along the flow direction (6) to clean the flow path; (h) a fourth valve (16d) located in a fluid path comprising a dead volume of a waste container (18) to store waste, the optical measuring device (2) and the probe (3); (i) a washing station (17); (j) a first pressure sensor (22) that triggers the pump (20) when the pressure drops below a lower pressure threshold until an upper pressure threshold is reached; (k) a second pressure sensor (23) that triggers the first valve (16a) to open when a lower pressure threshold is reached and triggers the first valve (16a) to close when an upper pressure threshold is reached; (l) a third pressure sensor (24) that triggers the second pump (25) when a pressure in the apparatus increases to an upper limit until a lower pressure limit is reached; and (m) a second pump (25) to maintain a negative pressure in the apparatus, wherein the negative pressure in the apparatus draws the liquid sample through the probe (3) and optical measuring device (2) along a flow direction (5) when the fourth valve (16d) is open; wherein when the second valve (16b) and third valve (16c) are closed and the fourth valve (16d) is open, the negative pressure in the apparatus draws the sample through the flow path during the optical measurement. In some embodiments, when the second valve (16b) and third valve (16c) are closed and the fourth valve (16d) is open, the negative pressure in the apparatus draws air through the flow path to dry the flow path. In other embodiments, the apparatus comprises one or more flow meters or liquid detection sensors. In some embodiments, the apparatus comprises two flow meters or liquid detection sensors. In other embodiments, the apparatus comprises three flow meters or liquid detection sensors. In yet other embodiments, the apparatus comprises four flow meters or liquid detection sensors.

In other embodiments of the third aspect described above, the apparatus further comprises an optional fifth valve (16f), wherein the optional fifth valve (16f) when closed reduces the amount of liquid sample and/or cleaning liquid present in the flow path. In other embodiments, the apparatus further comprises an optional sixth valve (16g), wherein the optional sixth valve (16g) when closed reduces the amount of liquid sample and/or cleaning liquid present in the flow path. In some embodiments the apparatus further comprises an optional seventh valve (16h), wherein the optional seventh valve (16h) controls the negative pressure in the apparatus to draw the liquid sample through the probe (3) and optical measuring device (2). In some embodiments where the fifth valve (16f) is present, when the fourth valve (16d) is closed, the fifth valve (16f) is open, and the valve (10) is open or opening and closing, the negative pressure in the apparatus generated by pump (25) draws air through the flow path to dry the flow path. In some embodiments, when the pressure in the apparatus decreases to a lower limit, the pressure sensor (24) triggers the seventh valve (16h) and vents the apparatus. In some embodiments, the apparatus comprises one or more flow meters or liquid detection sensors. In other embodiments, the apparatus comprises two flow meters or liquid detection sensors. In other embodiments, the apparatus comprises three flow meters or liquid detection sensors. In yet other embodiments, the apparatus comprises four flow meters or liquid detection sensors.

In some embodiments of the third aspect described above, the optical measuring device comprises a light source, a measuring cell, and a detection unit. In other embodiments, the apparatus further comprises a flow meter or liquid detection sensor. In some particular embodiments, the apparatus further comprises a pump, a pressure vessel, and a valve the controls the pressure inside the pressure vessel. The configuration of a pump, a pressure vessel, and valve is known in the art as a "pressure-time dosing" system which controls the flow in the apparatus with high precision compared to a pump alone. In some embodiments, one or more "pressure-time dosing" systems may be used to control the flow in the apparatus. In some embodiments, two "pressure-time dosing" systems, one maintaining a positive pressure and the other maintaining a negative pressure, may be used to control the flow in the apparatus. In other particular embodiments, the apparatus further comprises a humidity sensor in fluid connection with the flow path. In other particular embodiments, the apparatus further comprises a washing station. In yet other particular embodiments, the washing station comprises a conductivity sensor.

Figure 2:
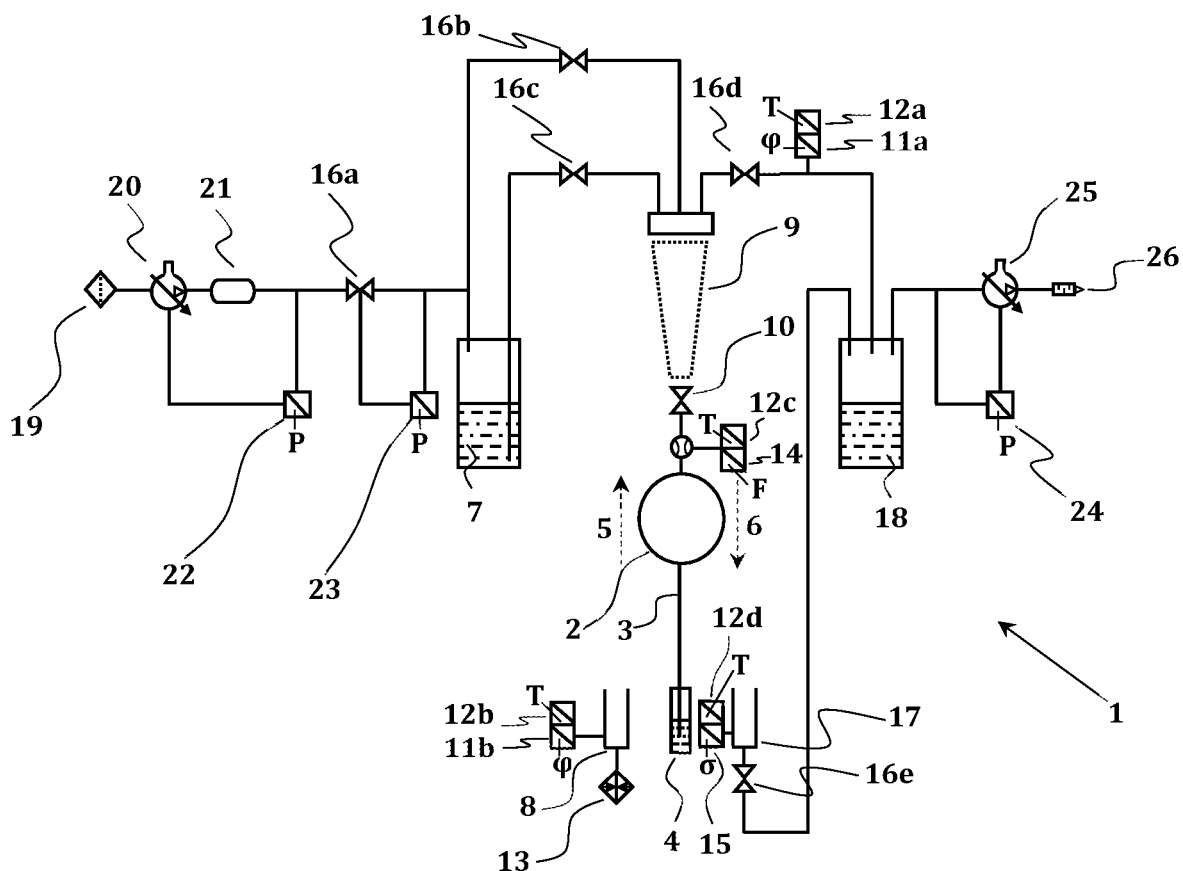
FIG. 2 depicts a schematic diagram illustrating a first embodiment of an optical measurement apparatus adapted to carry out the methods of analyzing liquid samples using the single-use, disposable container disclosed herein.
Figure 6:
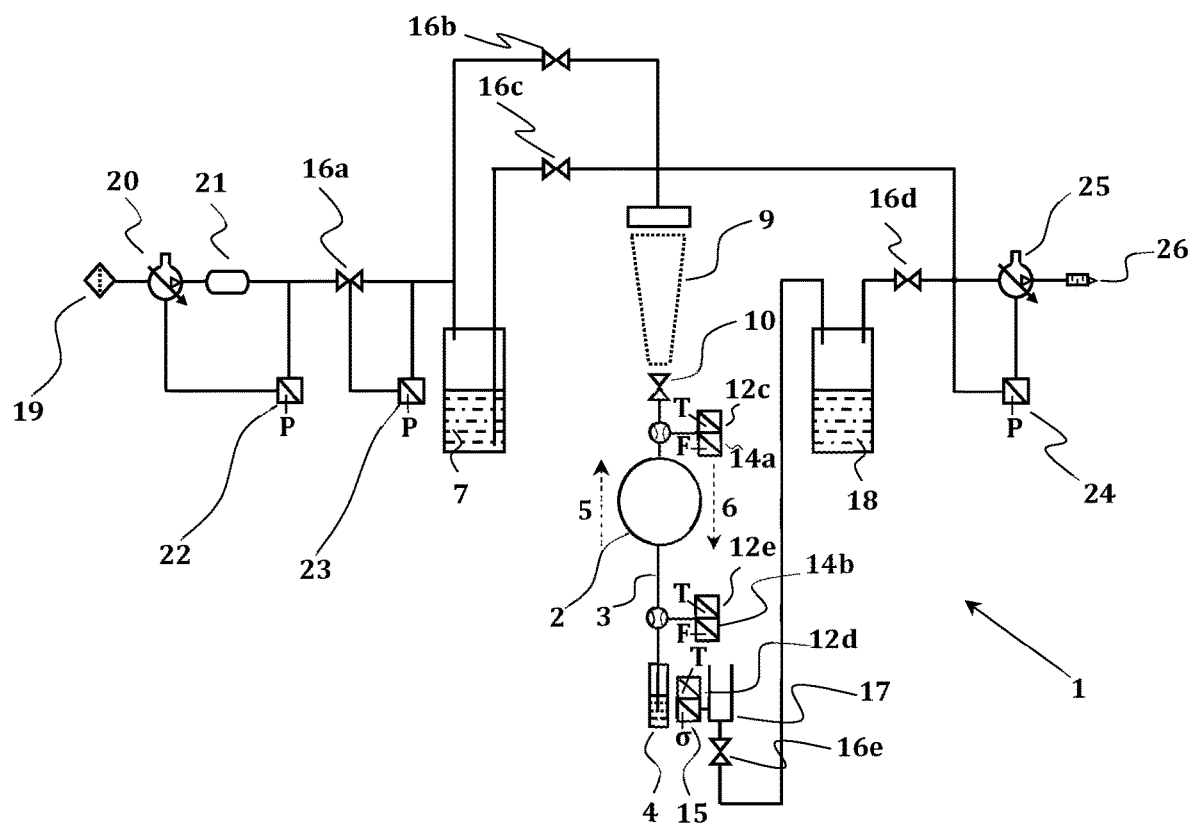
FIG. 6 depicts a schematic diagram illustrating a second embodiment of an optical measurement apparatus adapted to carry out the methods of analyzing liquid samples using the single-use, disposable container disclosed herein.

In a fourth aspect, the invention relates to an apparatus, wherein the apparatus comprises: (a) an optical measuring device (2); (b) a probe (3) in fluid communication with the optical measuring device to draw a liquid sample from a container (4) along a flow path; (c) a vessel to store cleaning solution (7); (d) an optional drying apparatus (8); (e) an intermediate container (9), wherein the intermediate container (9) is the single-use, disposable container of item 1 or any embodiment of the single-use, disposable container disclosed herein; (f) an optional valve (10); (g) an optional humidity sensor (11); (h) an optional temperature sensor (12); (i) an optional heat source (13); (j) an optional flow meter (14) or optional liquid detection sensor; (k) an optional conductivity sensor (15); (l) a first valve (16a) located between a first pump (20) and the vessel to store the cleaning solution (7); wherein the first pump (20) maintains a positive pressure in the apparatus; and wherein the positive pressure in the apparatus pushes a liquid sample along a flow direction (6); (m) a second valve (16b) located between a dead volume of the vessel to store the cleaning solution (7) and a fluid path comprising the optical measuring device (2) and the probe (3); (n) a third valve (16c) located between a volume of cleaning solution contained in the vessel (7) and the fluid path comprising the optical measuring device (2) and the probe (3); (o) a fourth valve (16d) located in a fluid path comprising a dead volume of a waste container (18) to store waste, the optical measuring device (2) and the probe (3); (p) a washing station (17); (q) an optional pressure vessel (21); (r) a first pressure sensor (22) that triggers the pump (20) when the pressure drops below a lower pressure threshold until an upper pressure threshold is reached; (s) a second pressure sensor (23) that triggers the first valve (16a) to open when a lower pressure threshold is reached and triggers the first valve (16a) to close when an upper pressure threshold is reached; (t) a third pressure sensor (24) that triggers the second pump (25) when a pressure in the apparatus increases to an upper limit until a lower pressure limit is reached; and (u) a second pump (25) to maintain a negative pressure in the apparatus, wherein the negative pressure in the apparatus draws the liquid sample through the probe (3) and optical measuring device (2) along a flow direction (5). In some embodiments, when the second valve (16b) and third valve (16c) are closed and the fourth valve (16d) is open, the negative pressure in the apparatus draws air through the flow path to dry the flow path. In other embodiments, the apparatus comprises one or more flow meters or liquid detection sensors. In other embodiments, the apparatus comprises two flow meters or liquid detection sensors. In other embodiments, the apparatus comprises three flow meters or liquid detection sensors. In yet other embodiments, the apparatus comprises four flow meters or liquid detection sensors. Specific embodiments of such an apparatus are shown in FIGS. 2 and 6.

Figure 7:
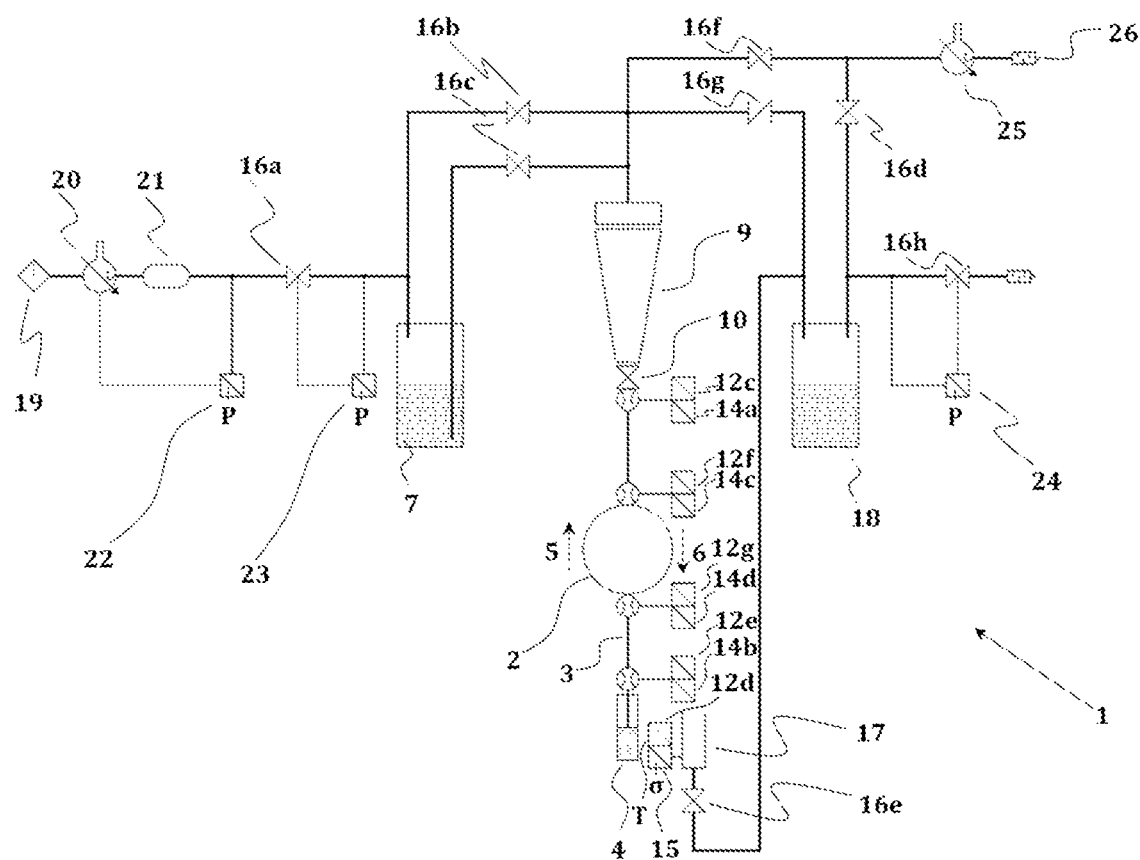
FIG. 7 depicts a schematic diagram illustrating a third embodiment of an optical measurement apparatus adapted to carry out the methods of analyzing liquid samples using the single-use, disposable container disclosed herein.

In some embodiments of the fourth aspect described above, the apparatus further comprises an optional fifth valve (16f), wherein the optional fifth valve (16f) when closed reduces the amount of liquid sample and/or cleaning liquid present in the flow path. In other embodiments, the apparatus further comprises an optional sixth valve (16g), wherein the optional sixth valve (16g) when closed reduces the amount of liquid sample and/or cleaning liquid present in the flow path. In some embodiments the apparatus further comprises an optional seventh valve (16h), wherein the optional seventh valve (16h) controls the negative pressure in the apparatus to draw the liquid sample through the probe (3) and optical measuring device (2). In other embodiments where the fifth valve (16f) is present, when the fourth valve (16d) is closed, the fifth valve (16f) is open, and the valve (10) is open or opening and closing, the negative pressure in the apparatus generated by pump (25) draws air through the flow path to dry the flow path. In some embodiments, when the pressure in the apparatus decreases to a lower limit, the pressure sensor (24) triggers the seventh valve (16h) and vents the apparatus. In some embodiments, the apparatus comprises one or more flow meters or liquid detection sensors. In other embodiments, the apparatus comprises two flow meters or liquid detection sensors. In other embodiments, the apparatus comprises three flow meters or liquid detection sensors. In yet other embodiments, the apparatus comprises four flow meters or liquid detection sensors. A specific embodiment of such an apparatus is shown in FIG. 7.

In a fifth aspect, the invention relates to an apparatus, wherein the apparatus comprises: (a) an optical measuring device (2); (b) a probe (3) in fluid communication with the optical measuring device to draw a liquid sample from a container (4) along a flow path; (c) a vessel to store cleaning solution (7); (d) an optional drying apparatus (8); (e) an intermediate container (9), wherein the intermediate container (9) is the single-use, disposable container of item 1 or any embodiment of the single-use, disposable container disclosed herein; (f) an optional valve (10); (g) an optional humidity sensor (11); (h) an optional temperature sensor (12); (i) an optional heat source (13); (j) an optional flow meter (14) or optional liquid detection sensor; (k) an optional conductivity sensor (15); (l) a first valve (16a) located between a first pump (20) and the vessel to store the cleaning solution (7); wherein the first pump (20) and the first valve (16a) maintain a positive pressure in the apparatus; (m) a second valve (16b) located between a dead volume of the vessel to store the cleaning solution (7) and a fluid path comprising the optical measuring device (2) and the probe (3), wherein the positive pressure in the apparatus pushes a liquid sample along a flow direction (6) when the second valve (16b) is open; (n) a third valve (16c) located between a volume of cleaning solution contained in the vessel (7) and the fluid path comprising the optical measuring device (2) and the probe (3); wherein when the second valve (16b) is closed and the third valve (16c) is open, the cleaning solution is pushed along the flow direction (6) to clean the flow path; (o) a fourth valve (16d) located in a fluid path comprising a dead volume of a waste container (18) to store waste, the optical measuring device (2) and the probe (3); (p) a washing station (17); (q) an optional pressure vessel (21); (r) a first pressure sensor (22) that triggers the pump (20) when the pressure drops below a lower pressure threshold until an upper pressure threshold is reached; (s) a second pressure sensor (23) that triggers the first valve (16a) to open when a lower pressure threshold is reached and triggers the first valve (16a) to close when an upper pressure threshold is reached; (t) a third pressure sensor (24) that triggers the second pump (25) when a pressure in the apparatus increases to an upper limit until a lower pressure limit is reached; and (u) a second pump (25) to maintain a negative pressure in the apparatus, wherein the negative pressure in the apparatus draws the liquid sample through the probe (3) and optical measuring device (2) along a flow direction (5) when the fourth valve (16d) is open; wherein when the second valve (16b) and third valve (16c) are closed and the fourth valve (16d) is open, the negative pressure in the apparatus draws the sample through the flow path during the optical measurement. In some embodiments, when the second valve (16b) and third valve (16c) are closed and the fourth valve (16d) is open, the negative pressure in the apparatus draws air through the flow path to dry the flow path. In some embodiments, the apparatus comprises one or more flow meters or liquid detection sensors. In other embodiments, the apparatus comprises two flow meters or liquid detection sensors. In other embodiments, the apparatus comprises three flow meters or liquid detection sensors. In yet other embodiments, the apparatus comprises four flow meters or liquid detection sensors. Specific embodiments of such an apparatus are shown in FIGS. 2 and 6.

In some embodiments of the fifth aspect described above, the apparatus further comprises an optional fifth valve (16f), wherein the optional fifth valve (16f) when closed reduces the amount of liquid sample and/or cleaning liquid present in the flow path. In other embodiments, the apparatus further comprises an optional sixth valve (16g), wherein the optional sixth valve (16g) when closed reduces the amount of liquid sample and/or cleaning liquid present in the flow path. In some embodiments the apparatus further comprises an optional seventh valve (16h), wherein the optional seventh valve (16h) controls the negative pressure in the apparatus to draw the liquid sample through the probe (3) and optical measuring device (2). In other embodiments where the fifth valve (16f) is present, when the fourth valve (16d) is closed, the fifth valve (16f) is open, and the valve (10) is open or opening and closing, the negative pressure in the apparatus generated by pump (25) draws air through the flow path to dry the flow path. In some embodiments, when the pressure in the apparatus decreases to a lower limit, the pressure sensor (24) triggers the seventh valve (16h) and vents the apparatus. In some embodiments, the apparatus comprises one or more flow meters or liquid detection sensors. In other embodiments, the apparatus comprises two flow meters or liquid detection sensors. In other embodiments, the apparatus comprises three flow meters or liquid detection sensors. In yet other embodiments, the apparatus comprises four flow meters or liquid detection sensors. A specific embodiment of such an apparatus is shown in FIG. 7.

DETAILED DESCRIPTION OF THE DRAWING FIGURES

FIG. 1 depicts a schematic diagram illustrating a non-limiting embodiment of a single-use, disposable container as disclosed herein.

FIG. 2 depicts a schematic diagram illustrating a non-limiting embodiment of an optical measurement apparatus used to carry out the methods disclosed herein. As shown in FIG. 1, the optical measurement apparatus 1 includes an optical measuring device 2 with a probe 3 that is introduced into a container 4 that contains the liquid sample. Two pressure-time dosing systems work together to generate a constant flow throughout the apparatus. The first pressure-time dosing system includes a pump 20 (e.g., a membrane pump), a pressure vessel 21, a precision valve 16a, and the volume of the vessel containing the cleaning solution 7. An optional air filter 19 is connected to the pump 20 to ensure that particulate contaminants are not introduced into the system. The first pressure-time dosing system maintains a positive pressure to be introduced into the system as controlled by pressure sensors 22 and 23. When the pressure at sensor 22 drops below a lower threshold (e.g., 2.5 bar or 250 kPa), sensor 22 triggers pump 20 until an upper threshold (e.g., 3 bar or 300 kPa) is reached. Sensor 23 measures the pressure in vessel 7 and triggers valve 16a. Valve 16a opens if sensor 23 measures a lower threshold (e.g., 0.100 bar or 10 kPa) and closes if sensor 23 reaches an upper threshold (e.g., 0.105 bar or 10.5 kPa). The second pressure-time dosing system includes a pump 25, the volume of the waste container 18, and a valve 16d. Pressure sensor 24 triggers pump 25. An optional silencer 26 is associated with pump 25. The second pressure-time dosing system generates a negative pressure in the system. When the pressure in vessel 18 which is measured by sensor 24 increases to an upper limit (e.g., −0.095 bar or −9.5 kPa), sensor 24 triggers pump 25 until a lower pressure limit (e.g., −0.105 bar or −10.5 kPa) is reached. The negative pressure draws the liquid sample from container 4 through the probe 3 and through the optical measuring device 2 along a flow direction 5 and an optical measurement may be made as the liquid sample travels along the flow direction 5. Along the flow path, a flow meter 14 (or alternatively, a liquid detection sensor) is configured to accurately measure the flow of the liquid in the path. A temperature sensor 12c is associated with the flow meter 14. The flow meter 14 and associated temperature sensor 12c may be substituted by a liquid detection sensor.

The liquid sample may be temporarily stored in an intermediate container 9, wherein the intermediate container 9 is any embodiment of the single-use, disposable container disclosed herein. When the liquid sample is temporarily stored in intermediate container 9, the valve 10 may be closed, and the liquid sample may optionally be degassed with the negative pressure generated by the second pressure-time dosing system. Additional analytical measurements may be carried out on the liquid sample while flowing in the flow path. Alternatively, additional analytical measurements may be carried out on the liquid sample while the liquid sample is temporarily stored in the intermediate container 9, wherein the intermediate container 9 is any embodiment of the single-use, disposable container disclosed herein. After the liquid sample is temporarily stored in the intermediate container or after the first optical measurement, the positive pressure generated by the first pressure-time dosing system is introduced into the system by opening valve 16b and valve 10 (if closed for degassing). The sample is pushed by the positive pressure along the flow direction 6, through the optical measuring device 2, and another optical measurement may be made. The liquid sample is then returned to a container 4 that may be the same container that originally held the sample or a different container. Valve 16b is subsequently closed. The beginning and end of the sample volume may be detected by the flow meter 14 or liquid detection sensor, which may be used for triggering valves 10 and 16b. The first optical measurement along flow direction 5 and second optical measurement along flow direction 6 may optionally be compared to identify any irregularities in the system, such as, for example, air bubbles. The intermediate storage container, wherein the intermediate container is any embodiment of the single-use, disposable container disclosed herein, may be disposed of between samples.

Figures 3A, 3B:
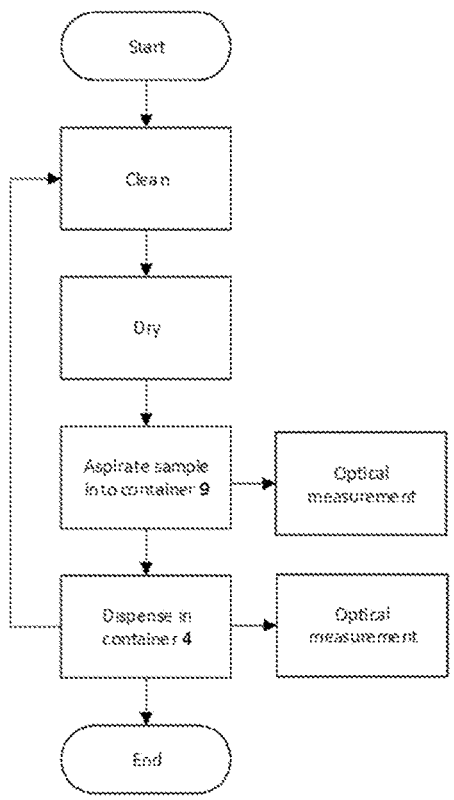
FIG. 3A depicts the valve positions during the method steps of an embodiment of the invention disclosed herein.
FIG. 3B depicts an example cycle of an embodiment of the methods disclosed herein.
Figure 4:
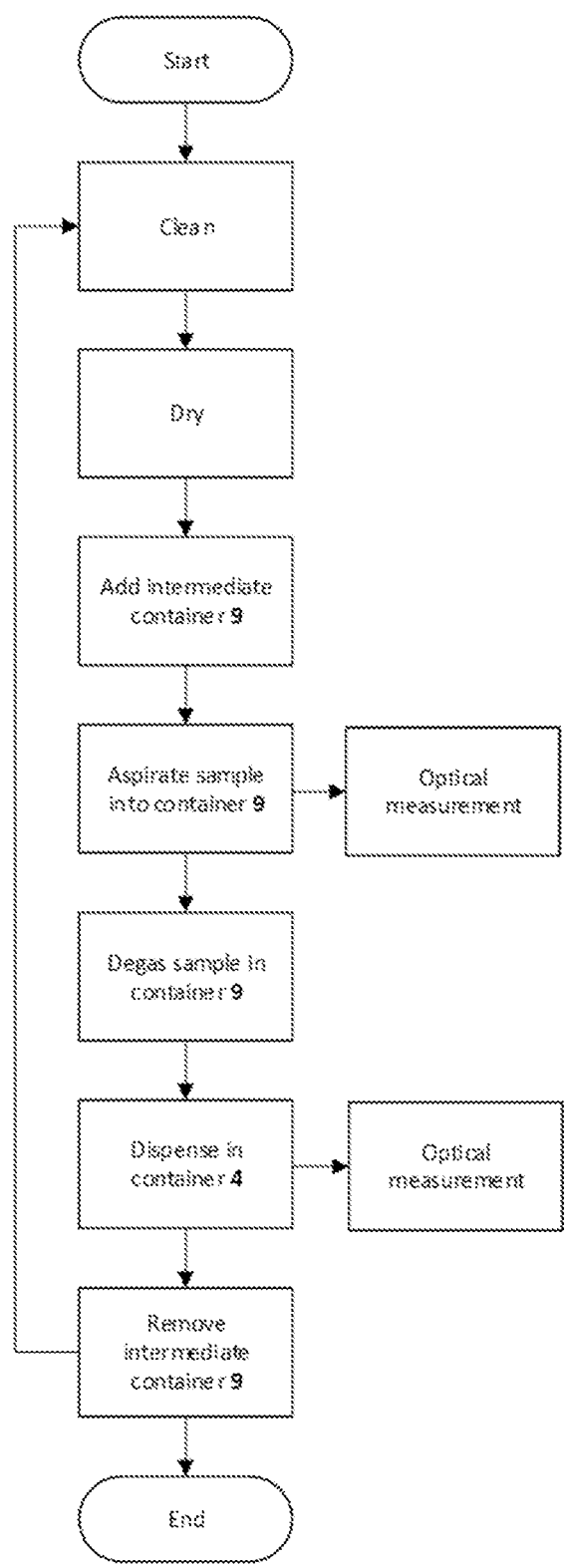
FIG. 4 depicts an example cycle of an embodiment of the methods disclosed herein with an optional degassing step.

FIG. 3A depicts the valve positions during the cleaning, drying, aspirating of sample, and dispensing of sample of an embodiment of the methods disclosed herein. FIG. 3B depicts an example cycle of an embodiment of the methods disclosed herein where the liquid sample is aspirated into the intermediate container 9, wherein the intermediate container 9 is any embodiment of the single-use, disposable container disclosed herein. FIG. 4 depicts an example cycle of an embodiment of the methods disclosed herein where the sample is degassed in container 9, wherein the intermediate container 9 is any embodiment of the single-use, disposable container disclosed herein.

Figure 5:
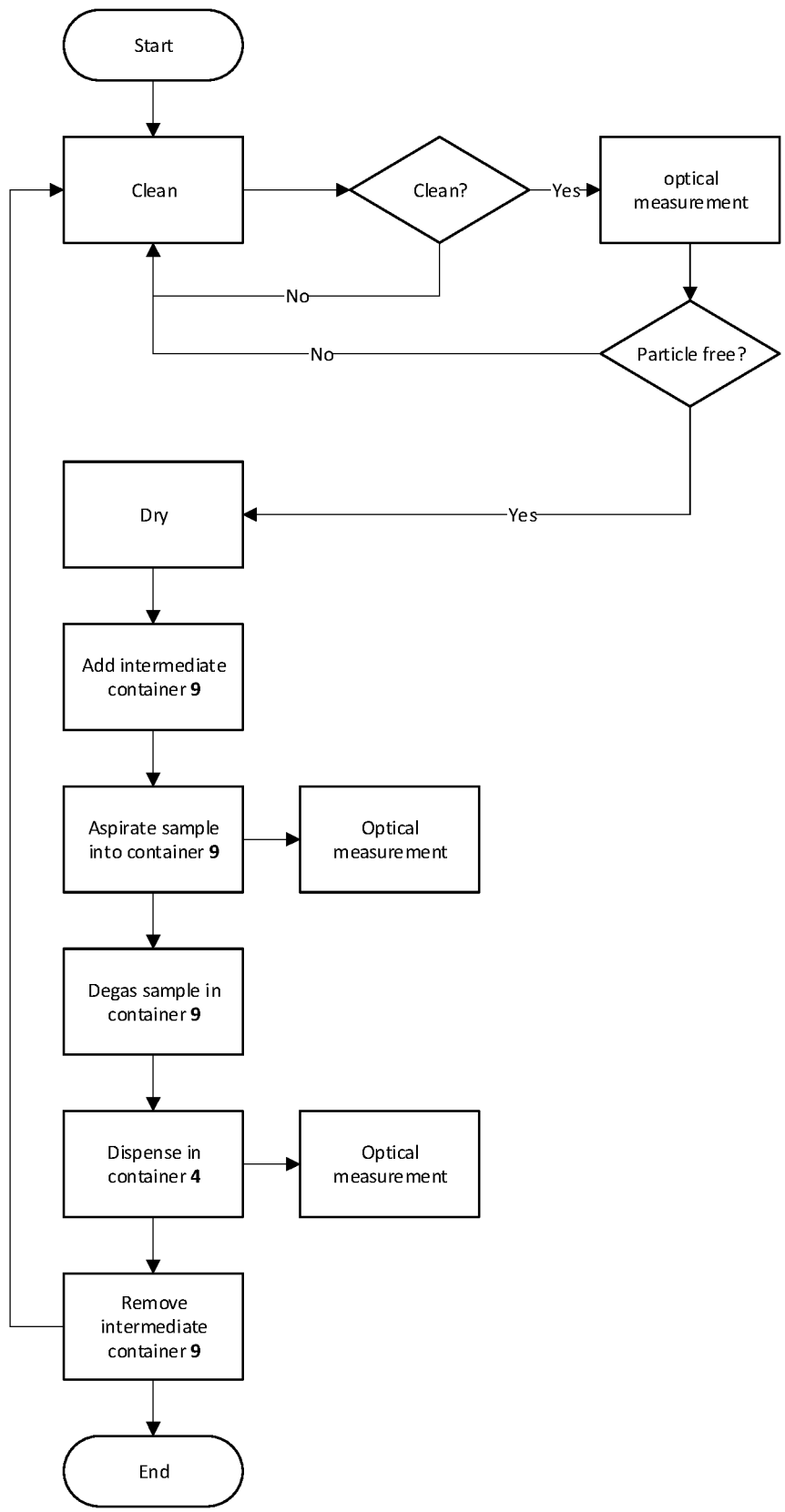
FIG. 5 depicts an example cycle of an embodiment of the methods disclosed herein with an optional degassing step and cleaning cycle.

Referring again to FIG. 2, after the optical measurements have been made, cleaning fluid from vessel 7 cleans the fluid path. To clean the fluid path, probe 3 is placed in washing station 17 with associated valve 16e, temperature sensor 12d, and conductivity sensor 15. Valve 16b is closed and 16c opened, pushing the cleaning fluid along flow direction 6 into the cleaning station 17. Valve 16d remains closed and the cleaning fluid in the washing station 17 is sucked into the waste container 18 by opening valve 16e. The cleaning procedure may be stopped when conductivity sensor 15 reaches a predetermined value (e.g., about 100, 10, or 5 µS/cm). All waste cleaning solutions may be collected in waste container 18. The cleaning procedure may also be stopped after taking an optical measurement of the cleaning fluid in the fluid path and determining that there are no longer any particles remaining in the path as depicted in FIG. 5 (example cycle of an embodiment of the methods disclosed herein).

Referring again to FIG. 2, after cleaning the fluid path, the fluid path is dried. In a primary drying step, the fluid path may be emptied by closing valve 16c and opening 16b. The fluid path is then further dried using an optional drying apparatus 8 that may be equipped with a heat source 13 to accelerate the secondary drying step. Humidity sensor 11b and temperature sensor 12b may be used to monitor the drying process. Valve 16b is then closed, and valve 16c remains closed. By opening valve 16d, air is sucked along flow direction 5 through the fluid path. The inlet air humidity is measured by sensor 11b at the drying station. Optionally this air is heated to a predetermined temperature (e.g., 60° C.). A secondary humidity sensor 11a is placed at the end of the fluid path that needs to be dried. The closing of valve 16d may be triggered if either the two humidity sensors monitor the same relative humidity or sensor 11a reaches a constant value. Alternatively, the drying process may be determined by drying the apparatus for a period of time until the residual liquid remaining in the apparatus reaches an acceptable limit (by testing, for example, contamination of a control sample by the residual liquid as a function of drying time).

FIG. 6 depicts a second non-limiting embodiment of an optical measurement apparatus used to carry out the methods disclosed herein. The apparatus depicted in FIG. 6 differs from the embodiment shown in FIG. 2 with the addition of a second flow meter 14b with associated temperature sensor 12e. The two flow meters and associated temperature sensors may be used to measure, for example, the viscosity of the liquid sample by measuring the time the liquid needs to travel between to the sensors. One or more or all of the flow meters 14a-14b and associated temperature sensors 12c and 12e may be substituted by one or more liquid detection sensors. The apparatus of FIG. 6 also differs from the FIG. 2 embodiment by a simplification of the flow path containing the valve 16c and repositioning of valve 16d. This rearrangement allows for pulling a vacuum in the flow path at a level that evaporates the remaining cleaning liquid (e.g., water) in the flow path but not evaporating the waste in the waste container, thereby protecting the environment if any volatile toxic waste present in the waste container. The rearrangement also allows for the ability to pull a higher vacuum in the flow path such that the drying apparatus 8 with heat source 13 is no longer needed to accelerate the drying process.

FIG. 7 depicts a third non-limiting embodiment of an optical measurement apparatus used to carry out the methods disclosed herein. The apparatus depicted in FIG. 7 differs from the embodiment shown in FIG. 6 with the addition of a third and fourth flow meter (14c, 14d) with associated temperature sensors (12f, 12g). The additional flow meters and associated temperature sensors may be used to determine the viscosity and/or necessary pressure more accurately to move the liquid at a defined flow rate. One or more or all of the flow meters 14a-14d and associated temperature sensors 12c and 12e-12g may be substituted by one or more liquid detection sensors. Additionally, the additional flow meters (14c, 14d) and associated temperature sensors (12f, 12g) or, alternatively, the liquid detection sensors, in proximity to the optical measuring device 2 secure when to start and stop counting the particles during the optical measurement. In other words, these sensors maximize the amount of sample that is analyzed by the optical measuring device 2. The upper flow meter 14a or liquid detection sensor in proximity to the valve 10 determines when to stop aspirating to avoid introduction of air bubbles into the sample during the optical measurement.

The third non-limiting embodiment shown in FIG. 7 also includes an optional valve 16h (e.g., a precision valve), to control the under pressure or negative pressure of the aspiration step accurately. The precision valve 16h, the pressure sensor 24, and the dead volume of the waste container 18 together function similarly as a pressure-time dosing system on the negative pressure side as the precision valve 16a, the pressure sensor 22, and the container 21 together functioning as a pressure-time dosing system on the positive pressure side. If the pressure in the apparatus decreases to a lower limit, the pressure sensor 24 triggers precision valve 16h and vents the apparatus. Two additional optional valves 16f and 16g may also be included. Closure of valves 16f and 16g during aspiration or cleaning reduces the amount of liquid sample and/or cleaning liquid that enters the flow path in the direction of the negative pressure side. This reduction in the flow path reduces the amount of time needed to dry the flow path to ensure that the sample is substantially the same before and after the optical measurement.

LIST OF REFERENCES
1 Optical measuring apparatus
2 Optical measuring device
3 Probe
4 Container
5 First flow direction
6 Second flow direction
7 Cleaning solution
8 Drying apparatus
9 Intermediate container, wherein the intermediate container is any embodiment of the single-use disposable container disclosed herein
10 Valve
11a-b Humidity sensor(s)
12a-g Temperature sensor(s) (when associated with a flow meter 14, may be substituted with liquid detection sensor)
13 Heat source
14, 14a-d Flow meter (may be substituted with liquid detection sensor)
15 Conductivity sensor
16a-h Valve(s) (e.g., precision valve(s))
17 Washing station
18 Waste container
19 Air filter
20 Pump (e.g., membrane pump)
21 Pressure vessel
22 Pressure sensor triggering pump 20
23 Pressure sensor triggering valve 16a for constant flow
24 Pressure sensor triggering pump 25
25 Pump
26 Silencer Item List Amongst others, the present invention relates to the following specific embodiments:

1. A single-use, disposable container, wherein the single-use, disposable container is stackable and fluidically sealable within a fluid path comprising a liquid sample analyzer, the single-use, disposable container comprising:
   (a) a material that accommodates a pressure up to about +250 kPa;
   (b) a frustoconical shape having an open top end and open bottom end to flow liquid through the container;
   (c) a flat top surface of the open top end comprising a top ring, wherein the flat top surface of the open top end of the container is fluidically sealable within the fluid path;
   (d) a flat bottom surface of the open bottom end comprising a bottom ring, wherein the flat bottom surface of the open bottom end of the container is fluidically sealable within the fluid path;
   (e) an outer surface of the frustoconical shape tapering from the inner edge of the top ring to the outer edge of the bottom ring;
   (f) a first set of spaced protrusions on the outer surface of the frustoconical shape supporting the top ring of the flat top surface, wherein the first set of spaced protrusions are adapted to facilitate stacking and de-stacking the container; and
   (g) a second set of spaced protrusions on the outer surface of the frustoconical shape located below the first set of spaced protrusions and above the flat bottom surface, wherein the second set of spaced protrusions minimizes surface area contact of the outer surface of the frustoconical shape with the inner surface of the frustoconical shape of an adjacent stacked container; and
   (h) an inner surface of the frustoconical shape;
   wherein the flat top surface, the flat bottom surface, and the inner surface of the frustoconical shape are polished with a surface average roughness (Ra) of not more than about 0.15 μm.

2. The single-use, disposable container of item 1, wherein the container is configurable to receive a volume of liquid of at least about 20 mL.

3. The single-use, disposable container of any of the preceding items, wherein the container is configurable to receive a volume of liquid of at least about 25 mL.

4. The single-use, disposable container of any of the preceding items, wherein the container has a wall thickness from about 0.3 mm to about 2.0 mm when measured at a location within the frustoconical shape of the container.

5. The single-use, disposable container of any of the preceding items, wherein the container has a wall thickness of about 0.7 mm when measured at a location within the frustoconical shape of the container.

6. The single-use, disposable container of any of the preceding items, wherein the height of the container is up to about 60 mm.

7. The single-use, disposable container of any of the preceding items, wherein the height of the container is from about 55 mm to about 60 mm.

8. The single-use, disposable container of any of the preceding items, wherein the height of the container is about 58.5 mm.

9. The single-use, disposable container of any of the preceding items, wherein the top ring has an external diameter of about 45 to about 55 mm measured from the outer edge.

10. The single-use, disposable container of any of the preceding items, wherein the top ring has an external diameter of about 51 mm measured from the outer edge.

11. The single-use, disposable container of any of the preceding items, wherein the top ring has an internal diameter of about 40 to about 50 mm measured from the inner edge.

12. The single-use, disposable container of any of the preceding items, wherein the top ring has an internal diameter of about 45 mm measured from the inner edge.

13. The single-use, disposable container of any of the preceding items, wherein the open bottom end of the container has a diameter of about 3.8 mm to about 12 mm.

14. The single-use, disposable container of any of the preceding items, wherein the open bottom end of the container has a diameter of about 5 mm.

15. The single-use, disposable container of any of the preceding items, wherein the container has a stacking height of about 1.5 mm to about 10 mm, and wherein the stacking height is defined as the distance between the flat top surface and a distal end of the first set of spaced protrusions.

16. The single-use, disposable container of any of the preceding items, wherein the container has a stacking height of about 5 mm, and wherein the stacking height is defined as the distance between the flat top surface and a distal end of the first set of spaced protrusions.

17. The single-use, disposable container of any of the preceding items, wherein:
   the container is configurable to receive a volume of liquid of at least about 25 ml;
   the container has a wall thickness of about 0.7 mm when measured at a location within the frustoconical shape of the container;

the container height is about 58.5 mm;
the top ring has an external diameter of about 51 mm;
the top ring has an internal diameter of about 45 mm;
the open bottom end of the container has a diameter of about 5 mm; and
the container has a stacking height of about 5 mm;
wherein the stacking height is defined as the distance between the flat top surface and a distal end of the first set of spaced protrusions.

18. The single-use, disposable container of any of the preceding items, wherein the material is a thermoplastic material.

19. The single-use, disposable container of any of the preceding items, wherein the material is a hydrocarbon polymer.

20. The single-use, disposable container of any of the preceding items, wherein the material is polypropylene.

21. The single-use, disposable container of any of the preceding items, wherein the material is resistant to sterilization using γ radiation.

22. The single-use, disposable container of any of the preceding items, wherein the surface average roughness (Ra) of the flat top surface, the flat bottom surface, and the inner surface of the frustoconical shape is from about 0.01 µm to about 0.15 µm.

23. The single-use, disposable container of any of the preceding items, wherein the surface average roughness (Ra) of the flat top surface is from about 0.020 µm to about 0.03 µm.

24. A method of performing an optical measurement in a liquid sample, the method comprising:
   (a) obtaining a first container filled with the liquid sample to be analyzed;
   (b) flowing the liquid sample along a first flow direction through a flow path comprising an optical measuring device and optionally performing an optical measurement of the liquid sample as the liquid sample flows in the first flow direction;
   (c) storing the liquid sample temporarily in an intermediate container after flowing the liquid sample along the first flow direction through the flow path comprising the optical measuring device and optionally performing the optical measurement of the liquid sample as the liquid sample flows in the first flow direction; wherein the intermediate container is the single-use, disposable container of any one of items 1 to 23;
   (d) flowing the liquid sample from the intermediate container along a second flow direction opposite the first flow direction through the flow path comprising the optical measuring device and performing the optical measurement of the liquid sample as the liquid sample flows in the second flow direction; and
   (e) flowing the liquid sample through the flow path into a second container after performing the optical measurement in the second flow direction;
   wherein the first container and the second container may be the same or different containers;
   and wherein when the liquid sample is in the second container it is substantially the same as when the liquid sample is in the first container.

25. The method of item 24, wherein the liquid sample in the second container is diluted with less than about 10 volume %, less than about 5 volume %, or less than about 1 volume % residual fluid in the fluid path.

26. The method of either item 24 or item 25, wherein the optical measurement is a light obscuration measurement, a light scattering measurement, or a combination thereof.

27. The method of any one of items 24 to 26, wherein the optical measuring device is an optical particle counter.

28. The method of any one of items 24 to 27, further comprising:
   (f) flowing a cleaning fluid through the flow path comprising the optical measuring device before step (b) and/or after the liquid sample has flowed into the second container.

29. The method of item 28, wherein the cleaning fluid is flowed through the flow path comprising the optical measuring device until a conductivity limit is reached.

30. The method of item 29, wherein the conductivity limit is less than about 100 microsiemens per centimeter (µS/cm) at about 2 to about 40° C.

31. The method of any one of items 28 to 30, further comprising:
   (g) drying the flow path subsequent to step (f).

32. The method of item 31, wherein the flow path is dried until a volume limit of residual fluid is reached.

33. The method of item 32, wherein the volume limit is less than about 100 µL.

34. The method of any one of items 24 to 33, further comprising performing an analytical measurement of the liquid sample in addition to the optical measurement.

35. The method of item 34, wherein the analytical measurement of the liquid sample is carried out while the fluid is flowing in the flow path in the first direction, the second direction, in both the first and the second directions, or while the fluid is temporarily stored in the intermediate container.

36. The method of any one of items 24 to 35, wherein the sample is not destroyed during performance of any of the method steps.

37. The method of any one of items 24 to 36, wherein the sample is not diluted with more than about 10 vol. %, about 5 vol. %, or about 1 vol. % residual fluid or cleaning fluid in the flow path, and wherein the sample is contaminated with less than about 0.01 wt. % other trace impurities.

38. The method of any one of items 24 to 37, wherein the liquid sample is recovered in the second container after performance of the method steps.

39. The method of item 38, wherein about 90% or 95% by volume of the liquid sample is recovered in the second container after performance of the method steps.

40. An apparatus adapted to carry out the method of any one of items 24 to 39, the apparatus comprising the optical measuring device and the single-use, disposable container of any one of items 1 to 23.

41. The apparatus of item 40, wherein the apparatus further comprises:
   (a) a probe (3) in fluid communication with the optical measuring device to draw a liquid sample from a container (4) along a flow path;
   (b) a vessel to store cleaning solution (7);
   (c) an optional temperature sensor (12);
   (d) an optional conductivity sensor (15);
   (e) a first valve (16a) located between a first pump (20) and the vessel to store the cleaning solution (7); wherein the first pump (20) and the first valve (16a) maintain a positive pressure in the apparatus;
   (f) a second valve (16b) located between a dead volume of the vessel to store the cleaning solution (7) and a fluid path comprising the optical measuring device (2) and the probe (3); wherein the positive pressure in the apparatus pushes a liquid sample along a flow direction (6) when the second valve (16b) is open;
   (g) a third valve (16c) located between a volume of cleaning solution contained in the vessel (7) and the fluid path comprising the optical measuring device (2) and the probe (3); wherein when the second valve (16b) is closed and the third valve (16c) is open, the cleaning solution is pushed along the flow direction (6) to clean the flow path;

(h) a fourth valve (16d) located in a fluid path comprising a dead volume of a waste container (18) to store waste, the optical measuring device (2) and the probe (3);

(i) a washing station (17);

(j) a first pressure sensor (22) that triggers the pump (20) when the pressure drops below a lower pressure threshold until an upper pressure threshold is reached;

(k) a second pressure sensor (23) that triggers the first valve (16a) to open when a lower pressure threshold is reached and triggers the first valve (16a) to close when an upper pressure threshold is reached;

(l) a third pressure sensor (24) that triggers the second pump (25) when a pressure in the apparatus increases to an upper limit until a lower pressure limit is reached; and (m) a second pump (25) to maintain a negative pressure in the apparatus, wherein the negative pressure in the apparatus draws the liquid sample through the probe (3) and optical measuring device (2) along a flow direction (5) when the fourth valve (16d) is open; wherein when the second valve (16b) and third valve (16c) are closed and the fourth valve (16d) is open, the negative pressure in the apparatus draws the sample through the flow path during the optical measurement.

42. An apparatus (1) comprising:
(a) an optical measuring device (2);
(b) a probe (3) in fluid communication with the optical measuring device to draw a liquid sample from a container (4) along a flow path;
(c) a vessel to store cleaning solution (7);
(d) an optional drying apparatus (8);
(e) an intermediate container (9), wherein the intermediate container (9) is the single-use, disposable container of any one of items 1 to 23;
(f) an optional valve (10);
(g) an optional humidity sensor (11);
(h) an optional temperature sensor (12);
(i) an optional heat source (13);
(j) an optional flow meter (14) or optional liquid detection sensor;
(k) an optional conductivity sensor (15);
(l) a first valve (16a) located between a first pump (20) and the vessel to store the cleaning solution (7); wherein the first pump (20) maintains a positive pressure in the apparatus; and wherein the positive pressure in the apparatus pushes a liquid sample along a flow direction (6);
(m) a second valve (16b) located between a dead volume of the vessel to store the cleaning solution (7) and a fluid path comprising the optical measuring device (2) and the probe (3);
(n) a third valve (16c) located between a volume of cleaning solution contained in the vessel (7) and the fluid path comprising the optical measuring device (2) and the probe (3);
(o) a fourth valve (16d) located in a fluid path comprising a dead volume of a waste container (18) to store waste, the optical measuring device (2) and the probe (3);
(p) a washing station (17);
(q) an optional pressure vessel (21);

(r) a first pressure sensor (22) that triggers the pump (20) when the pressure drops below a lower pressure threshold until an upper pressure threshold is reached;

(s) a second pressure sensor (23) that triggers the first valve (16a) to open when a lower pressure threshold is reached and triggers the first valve (16a) to close when an upper pressure threshold is reached;

(t) a third pressure sensor (24) that triggers the second pump (25) when a pressure in the apparatus increases to an upper limit until a lower pressure limit is reached; and (u) a second pump (25) to maintain a negative pressure in the apparatus, wherein the negative pressure in the apparatus draws the liquid sample through the probe (3) and optical measuring device (2) along a flow direction (5).

43. An apparatus (1) comprising:
(a) an optical measuring device (2);
(b) a probe (3) in fluid communication with the optical measuring device to draw a liquid sample from a container (4) along a flow path;
(c) a vessel to store cleaning solution (7);
(d) an optional drying apparatus (8);
(e) an intermediate container (9), wherein the intermediate container (9) is the single-use, disposable container of any one of items 1 to 23;
(f) an optional valve (10);
(g) an optional humidity sensor (11);
(h) an optional temperature sensor (12);
(i) an optional heat source (13);
(j) an optional flow meter (14) or optional liquid detection sensor;
(k) an optional conductivity sensor (15);
(l) a first valve (16a) located between a first pump (20) and the vessel to store the cleaning solution (7); wherein the first pump (20) and the first valve (16a) maintain a positive pressure in the apparatus;
(m) a second valve (16b) located between a dead volume of the vessel to store the cleaning solution (7) and a fluid path comprising the optical measuring device (2) and the probe (3), wherein the positive pressure in the apparatus pushes a liquid sample along a flow direction (6) when the second valve (16b) is open;
(n) a third valve (16c) located between a volume of cleaning solution contained in the vessel (7) and the fluid path comprising the optical measuring device (2) and the probe (3); wherein when the second valve (16b) is closed and the third valve (16c) is open, the cleaning solution is pushed along the flow direction (6) to clean the flow path;
(o) a fourth valve (16d) located in a fluid path comprising a dead volume of a waste container (18) to store waste, the optical measuring device (2) and the probe (3);
(p) a washing station (17);
(q) an optional pressure vessel (21);
(r) a first pressure sensor (22) that triggers the pump (20) when the pressure drops below a lower pressure threshold until an upper pressure threshold is reached;
(s) a second pressure sensor (23) that triggers the first valve (16a) to open when a lower pressure threshold is reached and triggers the first valve (16a) to close when an upper pressure threshold is reached;
(t) a third pressure sensor (24) that triggers the second pump (25) when a pressure in the apparatus increases to an upper limit until a lower pressure limit is reached; and (u) a second pump (25) to maintain a negative pressure in the apparatus, wherein the negative pressure in the apparatus draws the liquid sample through the probe (3) and optical measuring device (2) along a flow direction (5) when the fourth valve (16d) is open; wherein when the second valve (16b) and third valve (16c) are closed and the fourth valve (16d) is open, the negative pressure in the apparatus draws the sample through the flow path during the optical measurement.

44. The apparatus of any one of items 40 to 43, wherein the apparatus comprises one or more flow meters or liquid detection sensors.

45. The apparatus of any one of items 40 to 44, wherein the apparatus comprises two flow meters or liquid detection sensors.

46. The apparatus of any one of items 40 to 45, wherein the apparatus comprises three flow meters or liquid detection sensors.

47. The apparatus of any one of items 40 to 46, wherein the apparatus comprises four flow meters or liquid detection sensors.

48. The apparatus of any one of items 40 to 47, wherein the apparatus further comprises a fifth valve (16f), wherein the fifth valve (16f) when closed reduces the amount of liquid sample and/or cleaning liquid present in the flow path.

49. The apparatus of any one of items 40 to 48, wherein the apparatus further comprises a sixth valve (16g), wherein the sixth valve (16g) when closed reduces the amount of liquid sample and/or cleaning liquid present in the flow path.

50. The apparatus of any one of items 40 to 49, wherein the apparatus further comprises a seventh valve (16h), wherein the seventh valve (16h) controls the negative pressure in the apparatus to draw the liquid sample through the probe (3) and optical measuring device (2).

51. The apparatus of any one of items 40 to 47, wherein when the second valve (16b) and third valve (16c) are closed and the fourth valve (16d) is open, the negative pressure in the apparatus draws air through the flow path to dry the flow path.

52. The apparatus of any one of items 48 to 50, wherein when the fourth valve (16d) is closed, the fifth valve (16f) is open, and the valve (10) is open or opening and closing, the negative pressure in the apparatus generated by pump (25) draws air through the flow path to dry the flow path.

53. The apparatus of any one of items 50 to 52, wherein when the pressure in the apparatus decreases to a lower limit, the pressure sensor (24) triggers the seventh valve (16h) and vents the apparatus.

54. The single-use, disposable container of any one of items 1 to 23, wherein the top ring of the single-use, disposable container has a width of at least about 3 mm.

55. The single-use, disposable container of any one of items 1 to 23, wherein the top ring of the single-use, disposable container has a width of at least about 4 mm.

56. The single-use, disposable container of any one of items 1 to 23, wherein the top ring of the single-use, disposable container has a width of at least about 5 mm.

57. The single-use, disposable container of any one of items 1 to 23, wherein the top ring of the single-use, disposable container has a width of at least about 6 mm.

58. The single-use, disposable container of any one of items 1 to 23, wherein the bottom ring of the single-use, disposable container has a width of at least about 1 mm.

59. The single-use, disposable container of any one of items 1 to 23, wherein the bottom ring of the single-use, disposable container has a width of at least about 2 mm.

60. The single-use, disposable container of any one of items 1 to 23, wherein the bottom ring of the single-use, disposable container has a width of at least about 2.5 mm.

61. The single-use, disposable container of any one of items 1 to 23, wherein the top ring of the single-use, disposable container has a width of at least 2.9 mm.

62. The single-use, disposable container of any one of items 1 to 23, wherein the top ring of the single-use, disposable container has a width of at least about 3 mm and the bottom ring of the single-use-disposable container has a width of at least 1 mm.

63. The single-use, disposable container of any one of items 1 to 23, wherein the top ring of the single-use, disposable container has a width of at least about 4 mm and the bottom ring of the single-use-disposable container has a width of at least 2 mm.

64. The single-use, disposable container of any one of items 1 to 23, wherein the top ring of the single-use, disposable container has a width of at least about 5 mm and the bottom ring of the single-use-disposable container has a width of at least 2.5 mm.

65. The single-use, disposable container of any one of items 1 to 23, wherein the top ring of the single-use, disposable container has a width of at least about 6 mm and the bottom ring of the single-use-disposable container has a width of at least 2.9 mm.

EXAMPLES

The following examples serve to illustrate the invention, however, should not be understood as restricting the scope of the invention.

Example 1

The subvisible particle content of an aqueous suspension of 15 μm polystyrene microspheres was measured for instrument calibration. A volume (5 mL) of the liquid sample at 3800 particles/mL concentration and room temperature was aspirated by the negative pressure generated by the second pressure time dosing system (25, 24, volume in 18, 16d) through the probe 3 into the flow path along the first flow direction 5 and a pulse height measurement was made by the particle counter 2. A turbidity measurement was taken while the sample resided in intermediate container 9. The positive pressure generated by the first pressure time dosing system (20, 21, 16a, volume in 7) was introduced into the system. The positive pressure pushed the liquid sample along the second flow direction 6 through the particle counter 2 and a second pulse height measurement was made. The cleaning solution 7 was flushed through the flow path and the probe 3 was cleaned at the washing station 17. The drying apparatus 8 dried the flow path before introduction of the next sample to be analyzed.

Example 2

The subvisible particle content of a liquid sample of a therapeutic antibody formulation to be parentally administered to a patient is measured. A volume (5 mL) of the liquid sample at room temperature is aspirated by the negative pressure generated by the second pressure time dosing system (25, 24, volume in 18, 16d) through the probe 3 into the flow path along the first flow direction 5 and a pulse height measurement is made by the particle counter 2. The sample is temporarily stored in intermediate container 9, wherein the intermediate container 9 is any embodiment of the single-use, disposable container disclosed herein and degassed. A turbidity measurement is taken while the sample resides in intermediate container 9, wherein the intermediate container 9 is any embodiment of the single-use, disposable container disclosed herein. The positive pressure generated by the first pressure time dosing system (20, 21, 16a, volume in 7) is introduced into the system. The positive pressure pushes the liquid sample along the second flow direction 6 through the particle counter 2 and a second pulse height measurement is made. A calibration curve as determined by measurements of polystyrene microsphere standards using the procedure in Example 1 is applied to the pulse height measurements to determine the subvisible particle content and to classify the subvisible particle sizes of the therapeutic antibody formulation. The cleaning solution 7 is flushed through the flow path and the probe 3 is cleaned at the washing station 17. The drying apparatus 8 dries the flow path before introduction of the next sample to be analyzed.

Example 3

The single-use, disposable container was manufactured using a conventional injection molding process using polypropylene as the material. The top and bottom ring and the inner surface of the single-use, disposable container was then machined to the SPI (Society of the Plastics Industry) A-2 polish standard on the tool side.

Example 4

The surface average roughness (Ra) of the flat top surface of an embodiment of the single-use, disposable container and the flat top surface of five commercially available pipette tips from suppliers Eppendorf® and Joanlab® (China) were measured using a Keyence 3D Laser scanning Microscope VK-X1100 at three different spots on the top with a measurement accuracy of +/−2%. The measurement head was a violet semiconductor laser and the method used was Keyence—surface roughness ISO 25178. The results are summarized in Table 1, below.

TABLE 1

| Sample | surface average roughness (Ra) in μm |
| --- | --- |
| 1. Joanlab 1000 μL pipette tip, blue | 0.506 |
| 2. Joanlab 200 μL pipette tip, yellow | 0.870 |
| 3. Joanlab 10 μL pipette tip, colorless | 0.441 |
| 4. Eppendorf PCR clean and sterile, 50-1000 μL, 76 mm, colorless tip, Ep Dualfilter T.I.P.S., Catalog No. 0030078578 | 0.447 |
| 5. Eppendorf Quality, 2-200 μL, 53 mm, colorless tip, Ep T.I.P.S. Standard, Catalog No. 003000089 | 0.174 |
| 6. Single-use, disposable container of the present disclosure | 0.022 |

The top surfaces of the pipette tips show a surface average roughness (Ra) value between 0.174 and 0.870 μm while the top surface of an embodiment of the single-use, disposable container of the present disclosure was significantly lower with a measured value of 0.022 μm. The top surfaces of the pipette tips are not sufficiently smooth enough to seal in a liquid sample analyzer apparatus as described herein.

Example 5

The surface average roughness (Ra) of the flat bottom surface of an embodiment of the single-use, disposable container and the flat bottom surface of five commercially available pipette tips from suppliers Eppendorf® and Joanlab® (China) were measured using a Keyence 3D Laser scanning Microscope VK-X1100 at three different spots on the bottom with a measurement accuracy of +/−2%. The measurement head was a violet semiconductor laser and the method used was Keyence—surface roughness ISO 25178. The results are summarized in Table 2, below.

TABLE 2

| Sample | surface average roughness (Ra) in μm |
| --- | --- |
| 1. Joanlab 1000 μL pipette tip, blue | 8.159 |
| 2. Joanlab 200 μL pipette tip, yellow | 3.794 |
| 3. Joanlab 10 μL pipette tip, colorless | 1.639 |
| 4. Eppendorf PCR clean and sterile, 50-1000 μL, 76 mm, colorless tip, Ep Dualfilter T.I.P.S., Catalog No. 0030078578 | 2.867 |
| 5. Eppendorf Quality, 2-200 μL, 53 mm, colorless tip, Ep T.I.P.S. Standard, Catalog No. 003000089 | 2.743 |
| 6. Single-use, disposable container of the present disclosure | 0.112 |

The bottom surfaces of the pipette tips show a surface average roughness (Ra) value between 1.639 and 8.159 μm while the bottom surface of an embodiment of the single-use, disposable container of the present disclosure was significantly lower with a measured value of 0.112 μm. The bottom surfaces of the pipette tips are also significantly rougher than the corresponding top surfaces of the pipette tips shown in Table 1. The bottom surfaces of the pipette tips are not sufficiently smooth enough to seal in a liquid sample analyzer apparatus as described herein.

The invention claimed is:

1. A single-use, disposable container, wherein the single-use, disposable container is stackable and fluidically sealable within a fluid path comprising a liquid sample analyzer, the single-use, disposable container comprising:
   (a) a material that accommodates a pressure up to about +250 kPa;
   (b) a frustoconical shape having an open top end and open bottom end to flow liquid through the container;
   (c) a flat top surface of the open top end comprising a top ring, wherein the flat top surface of the open top end of the container is fluidically sealable within the fluid path;
   (d) a flat bottom surface of the open bottom end comprising a bottom ring, wherein the flat bottom surface of the open bottom end of the container is fluidically sealable within the fluid path;
   (e) an outer surface of the frustoconical shape tapering from the inner edge of the top ring to the outer edge of the bottom ring;
   (f) a first set of at least two spaced protrusions on the outer surface of the frustoconical shape supporting the top ring of the flat top surface, wherein the first set of at least two spaced protrusions are adapted to facilitate stacking and de-stacking the container; and
   (g) a second set of at least two spaced protrusions on the outer surface of the frustoconical shape located below the first set of at least two spaced protrusions and above the flat bottom surface, wherein the second set of at least two spaced protrusions minimizes surface area contact of the outer surface of the frustoconical shape with the inner surface of the frustoconical shape of an adjacent stacked container; and (h) an inner surface of the frustoconical shape;

wherein the flat top surface, the flat bottom surface, and the inner surface of the frustoconical shape each have a surface average roughness (Ra) of not more than about 0.15 µm; and wherein:

the container is configurable to receive a volume of liquid of at least about 20 mL;

the container has a wall thickness of about 0.3 mm to about 2.0 mm when measured at a location within the frustoconical shape of the container;

the container height is up to about 60 mm;

the top ring has an external diameter of about 45 to about 55 mm;

the top ring has an internal diameter of about 40 to about 50 mm;

the open bottom end of the container has a diameter of about 3.8 mm to about 12 mm; and wherein a distance between the flat top surface and a distal end of the first set of at least two spaced protrusions is about 1.5 mm to about 10 mm.

2. The single-use, disposable container of claim 1, wherein the container is configurable to receive a volume of liquid of at least about 20 mL.

3. The single-use, disposable container of claim 1, wherein the container has a wall thickness from about 0.3 mm to about 2.0 mm when measured at a location within the frustoconical shape of the container.

4. The single-use, disposable container of claim 1, wherein:

the container is configurable to receive a volume of liquid of at least about 25 ml;

the container has a wall thickness of about 0.7 mm when measured at a location within the frustoconical shape of the container;

the container height is about 58.5 mm;

the top ring has an external diameter of about 51 mm;

the top ring has an internal diameter of about 45 mm;

the open bottom end of the container has a diameter of about 5 mm; and wherein a distance between the flat top surface and a distal end of the first set of at least two spaced protrusions is about 5 mm.

5. The single-use, disposable container of claim 1, wherein the surface average roughness (Ra) is from about 0.01 µm to about 0.15 µm.

6. A method of performing an optical measurement in a liquid sample, the method comprising:

(a) obtaining a first container filled with the liquid sample to be analyzed;

(b) flowing the liquid sample along a first flow direction through a flow path comprising an optical measuring device and optionally performing an optical measurement of the liquid sample as the liquid sample flows in the first flow direction;

(c) storing the liquid sample temporarily in an intermediate container after flowing the liquid sample along the first flow direction through the flow path comprising the optical measuring device and optionally performing the optical measurement of the liquid sample as the liquid sample flows in the first flow direction; wherein the intermediate container is the single-use, disposable container of claim 1;

(d) flowing the liquid sample from the intermediate container along a second flow direction opposite the first flow direction through the flow path comprising the optical measuring device and performing the optical measurement of the liquid sample as the liquid sample flows in the second flow direction; and (e) flowing the liquid sample through the flow path into a second container after performing the optical measurement in the second flow direction;

wherein the first container and the second container may be the same or different containers;

and wherein when the liquid sample is in the second container it is substantially the same as when the liquid sample is in the first container.

7. The method of claim 6, wherein the liquid sample in the second container is diluted with less than about 10 volume %, less than about 5 volume %, or less than about 1 volume % residual fluid in the fluid path.

8. The method of claim 6, further comprising:

(f) flowing a cleaning fluid through the flow path comprising the optical measuring device before step (b) and/or after the liquid sample has flowed into the second container.

9. The method of claim 8, wherein the cleaning fluid is flowed through the flow path comprising the optical measuring device until a conductivity limit is reached.

10. The method of claim 9, wherein the conductivity limit is less than about 100 microsiemens per centimeter (µS/cm) at about 2 to about 40° C.

11. The method of claim 6, further comprising:

(g) drying the flow path subsequent to step (f).

12. The method of claim 11, wherein the flow path is dried until a volume limit of residual fluid is reached.

13. The method of claim 12, wherein the volume limit is less than about 100 µL.

14. An apparatus comprising:

(a) an optical measuring device;

(b) a probe in fluid communication with the optical measuring device to draw a liquid sample from a container along a flow path;

(c) a vessel to store cleaning solution;

(d) an optional drying apparatus;

(e) an intermediate container, wherein the intermediate container is the single-use, disposable container of claim 1;

(f) an optional valve;

(g) an optional humidity sensor;

(h) an optional temperature sensor;

(i) an optional heat source;

(j) an optional flow meter or optional liquid detection sensor;

(k) an optional conductivity sensor;

(l) a first valve located between a first pump and the vessel to store the cleaning solution;

wherein the first pump maintains a positive pressure in the apparatus; and wherein the positive pressure in the apparatus pushes a liquid sample along a flow direction;

(m) a second valve located between a dead volume of the vessel to store the cleaning solution and a fluid path comprising the optical measuring device and the probe;

(n) a third valve located between a volume of cleaning solution contained in the vessel and the fluid path comprising the optical measuring device and the probe;

(o) a fourth valve located in a fluid path comprising a dead volume of a waste container to store waste, the optical measuring device and the probe;

(p) a washing station;

(q) an optional pressure vessel;

(r) a first pressure sensor that triggers the pump when the pressure drops below a lower pressure threshold until an upper pressure threshold is reached;
(s) a second pressure sensor that triggers the first valve to open when a lower pressure threshold is reached and triggers the first valve to close when an upper pressure threshold is reached;
(t) a third pressure sensor that triggers the second pump when a pressure in the apparatus increases to an upper limit until a lower pressure limit is reached; and
(u) a second pump to maintain a negative pressure in the apparatus, wherein the negative pressure in the apparatus draws the liquid sample through the probe and optical measuring device along a flow direction.

15. The apparatus of claim 14, wherein the apparatus comprises one or more flow meters or liquid detection sensors.

\* \* \* \* \*